United States Patent [19]
Knab et al.

[11] 3,992,697
[45] Nov. 16, 1976

[54] CHARACTER RECOGNITION SYSTEM UTILIZING FEATURE EXTRACTION

[75] Inventors: John L. Knab, Philadelphia; John J. McIntyre, Ardsley, both of Pa.

[73] Assignee: Scan-Data Corporation, Norristown, Pa.

[22] Filed: Dec. 27, 1974

[21] Appl. No.: 537,046

[52] U.S. Cl. ............ 340/146.3 MA; 340/146.3 AC
[51] Int. Cl.² ........................................ G06K 9/12
[58] Field of Search ........ 340/146.3 MA, 146.3 AC, 340/146.3 J, 146.3 Q, 146.3 AE

[56] References Cited
UNITED STATES PATENTS

| | | | |
|---|---|---|---|
| 3,273,124 | 9/1966 | Greanias | 340/146.3 J |
| 3,541,511 | 11/1970 | Genchi et al. | 340/146.3 AC |
| 3,573,730 | 4/1971 | Andrews et al. | 340/146.3 Q |
| 3,676,847 | 7/1972 | Partin | 340/146.3 AC |
| 3,868,635 | 2/1975 | Shah et al. | 340/146.3 MA |
| 3,873,972 | 3/1975 | Levine | 340/146.3 AC |
| 3,930,231 | 12/1975 | Henrichon et al. | 340/146.3 MA |

*Primary Examiner*—Leo H. Boudreau
*Attorney, Agent, or Firm*—Caesar, Rivise, Bernstein & Cohen, Ltd.

[57] ABSTRACT

A character recognition system comprising means for scanning a character on a document field, the field being composed of plural features each of which lies in a respectively defined area on the character. A pair of video shift registers, one for positive video and one for negative video, are provided to shift the signals therethrough. Each video shift register includes a plurality of stages for serially storing and shifting a binary quantization of a character pattern sample within said field. Feature extraction logic circuitry is provided and includes a plurality of feature detecting means to provide signals indicative of the recognition of predetermined features as the character pattern is shifted through selected stages of the video shift register. The detecting means include plural mask matrices coupled to said video shift registers. The output of the matrices are provided to encoding means for encoding the signals from the matrices into plural, multi-bit binary codes, one of such codes for each of said geographic areas. Each code serves to indicate a feature detected within the geographic area. Plural shift registers are provided coupled to the encoding means to store said codes. Decoding means are coupled to the code storing shift registers to decode the signals therefrom and to provide signals indicating the recognition of a character having the features detected. Further encoding means are provided to encode the signal indicating the recognition of a character into a binary code for use by a central processor. In order to minimize the number of components to create the masks some high usage masks are gated together and provided as inputs to other masks and the first encoding means. In addition, delay means are provided associated with each mask to duplicate sub-features without necessitating the use of separate components of each sub-feature.

18 Claims, 23 Drawing Figures

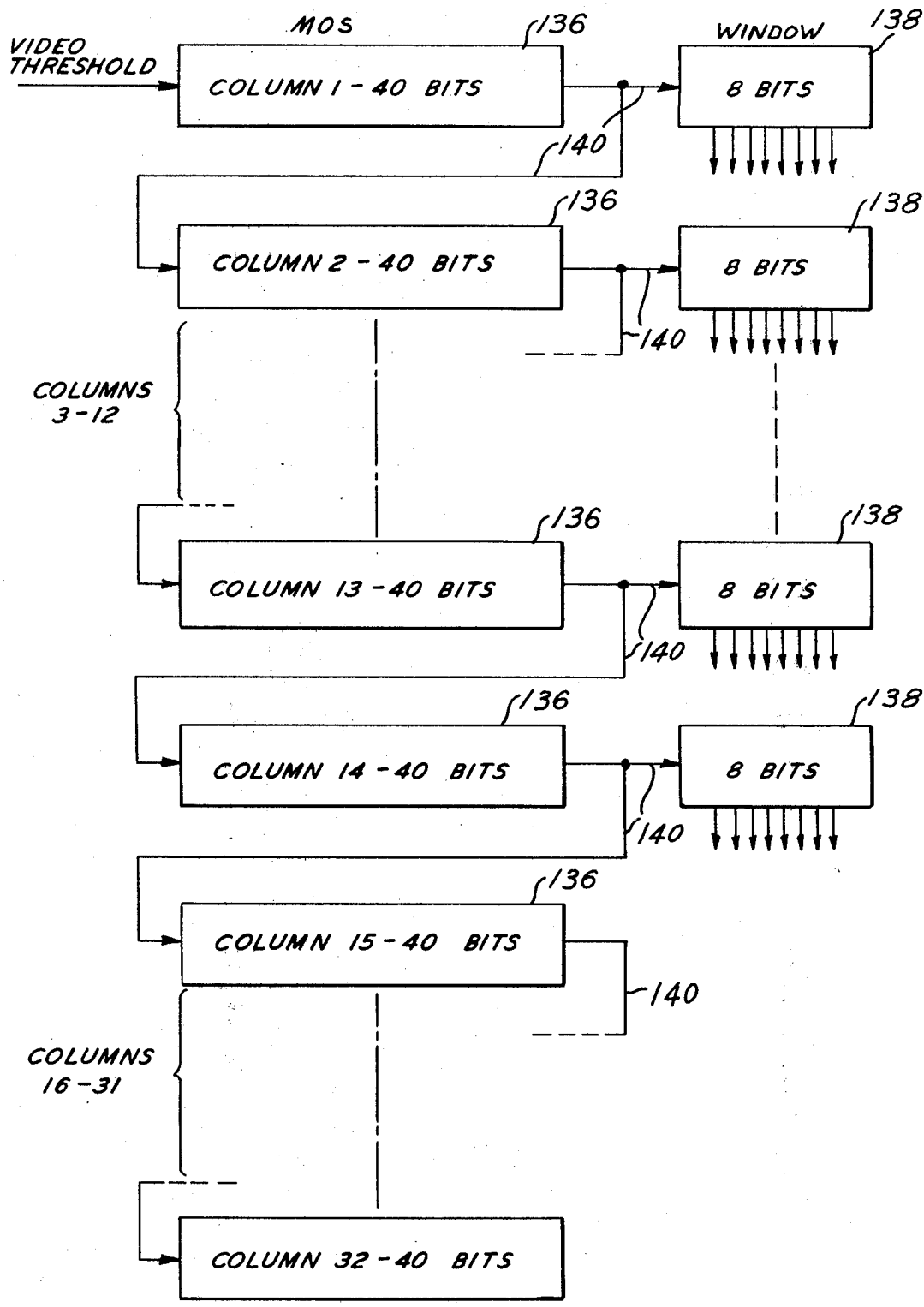

CHARACTER RECOGNITION SYSTEM UTILIZING FEATURE EXTRACTION

This invention relates to character recognition systems.

In U.S. Pat. No. 3,613,080, assigned to the same assignee as the instant invention and whose disclosure is incorporated by reference herein, there is disclosed and claimed a character recognition system which overcame the deficiencies of a prior art existing at that time. The system of that invention provides feature extraction logic utilizing a scanning pattern of indeterminate width and various subfeature masks to extract features independently of each other so that the interdependence of one feature upon another feature is completely eliminated.

To that end the system includes a shift register having a plurality of stages for serially storing and shifting a binary quantization of a character pattern sampled within a field on a document. Means are provided for recognizing a character in the register. Such means comprise a plurality of sub-feature masks, each of which is responsive to a different combination of stages of the shift register. The feature masks are connected only to selected ones of the stages of the shift register which correspond to an area of the field. The selected stages of the register form a window through which each of the features in the character pass. A plurality of feature detectors, each responsive to a different combination of sub-feature masks, are provided to detect the features present in the character pattern as they pass through the window.

Operation of the character recognition system is as follows: As the scanning pattern is serially shifted through the binary shift register, a portion of the shift register forming the window is constantly being sensed by a plurality of sub-feature masks. The sub-feature masks are connected to feature detectors which are responsive during a predetermined period of time to extract the features as they pass through the window. As the specific features of the character are detected registers store the features until specific combinations of features which form the character are present and specific features of other characters are not present, whereby the logic of the system determines that a character has been detected. As soon as a character is recognized the feature registers are erased and the scanning pattern continues right into the next pattern, thereby requiring no loss of time as the next character is sensed for registration. The features are extracted independently of each other and the storage register stores the features until all of the necessary features of a character have passed through the shift register window.

While the character recognition system of the aforementioned patent is completely sufficient for the purposes for which it was designed, such a system leaves something to be desired from the standpoint of ease of adaptability of the system for the addition of other various fonts or characters. For example, in order to arrange the system to recognize different or additional characters from the characters the system is initially programmed to recognize many various hard wire interconnections must be changed. This will be appreciated when one considers that in the aforenoted system the output of each feature of each character is connected as an input to a respective flip-flop for storing the feature. Accordingly, hundreds of flip-flops are required to store all of the features the system is to recognize. The output of all of the feature storage flip-flops are connected to associated character decoders. Therefore, in order to change, add or delete a character the interconnections for the components associated with the features making up the desired character must be changed and components added. For example, if a new character is to be added to the system the features making up such a character must be connected as respective inputs to flip-flops for storing such features and the output of the flip-flops must be connected to provide new inputs for the character decoder.

The system of the instant invention, while utilizing various advantageous aspects of the character recognition system of the aforenoted patent, adds to its flexibility and provides an extremely versatile system.

Accordingly, the general object of this invention is to provide a character recognition system which overcomes the disadvantages of the prior art.

It is a further object of this invention to provide a character recognition system which enables the addition, subtraction or substitution of characters for recognition in an extremely efficient and expenditions manner.

It is still a further object of this invention to provide a character recognition system which minimizes the number of components required for the detection of various sub-features of characters.

These and other objects of this invention are achieved by providing a character recognition system comprising means for scanning a character on a document field, said character being composed of plural features, each feature being in a respective geographic area defined on said character a video shift register having a plurality of stages for serially storing and shifting a binary quantization of a character pattern sample within the field on the document, improved feature extraction logic. The feature extraction logic comprises a plurality of feature detecting means, each responsive to the binary quantization to provide a signal which is indicative of the recognition of predetermined features as a character pattern sample passes through selected stages of the shift register. First encoding means are connected to the features detectors for encoding the signals from the feature detectors into plural, multi-bit binary codes, one such code for each geographic area of said field, each of said codes indicating the feature detected within its associated geographic area. Plural storage means are coupled to the first means. Each storage means serves to store a respective one of the codes. First decoding means are coupled to the storage means for decoding the information stored in all of the storage means to provide separate signals indicating the recognition of a character having the features detected. Means for encoding the separate signals into a binary code signal for use by a central processor are also provided.

Other objects and many of the attendant advantages of the present invention will be more readily appreciated as the same becomes better understood by reference to the detailed description when considered in connection with the accompanying drawings wherein:

FIG. 5 is a schematic diagram of one video shift register of this invention;

Figure 6A:
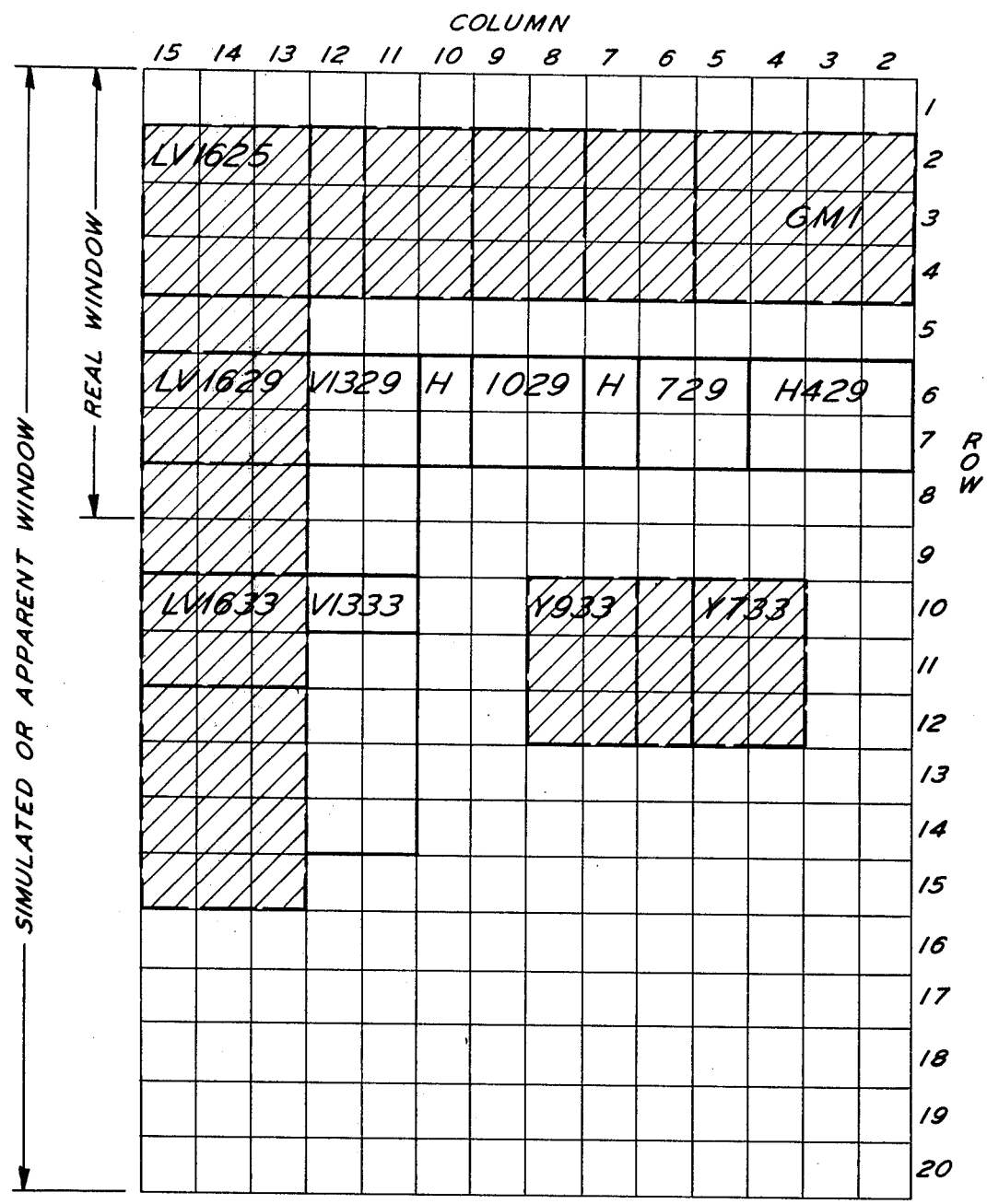
Figure 7:
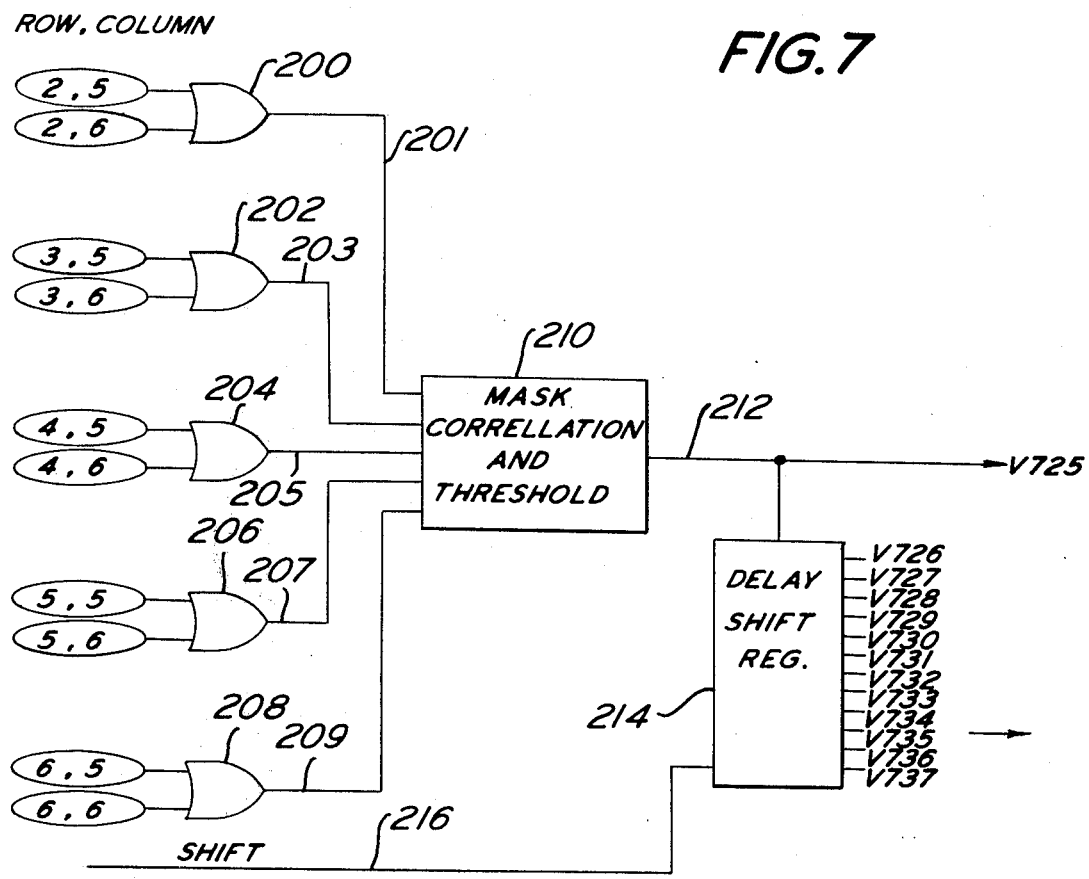
Figure 8:
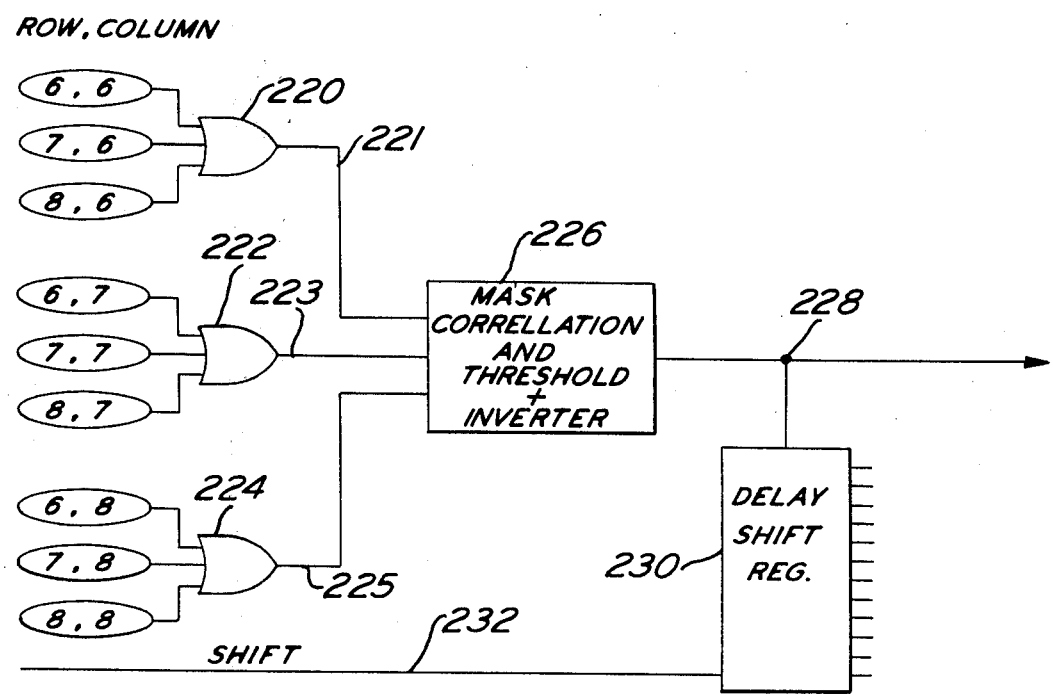
Figure 12:
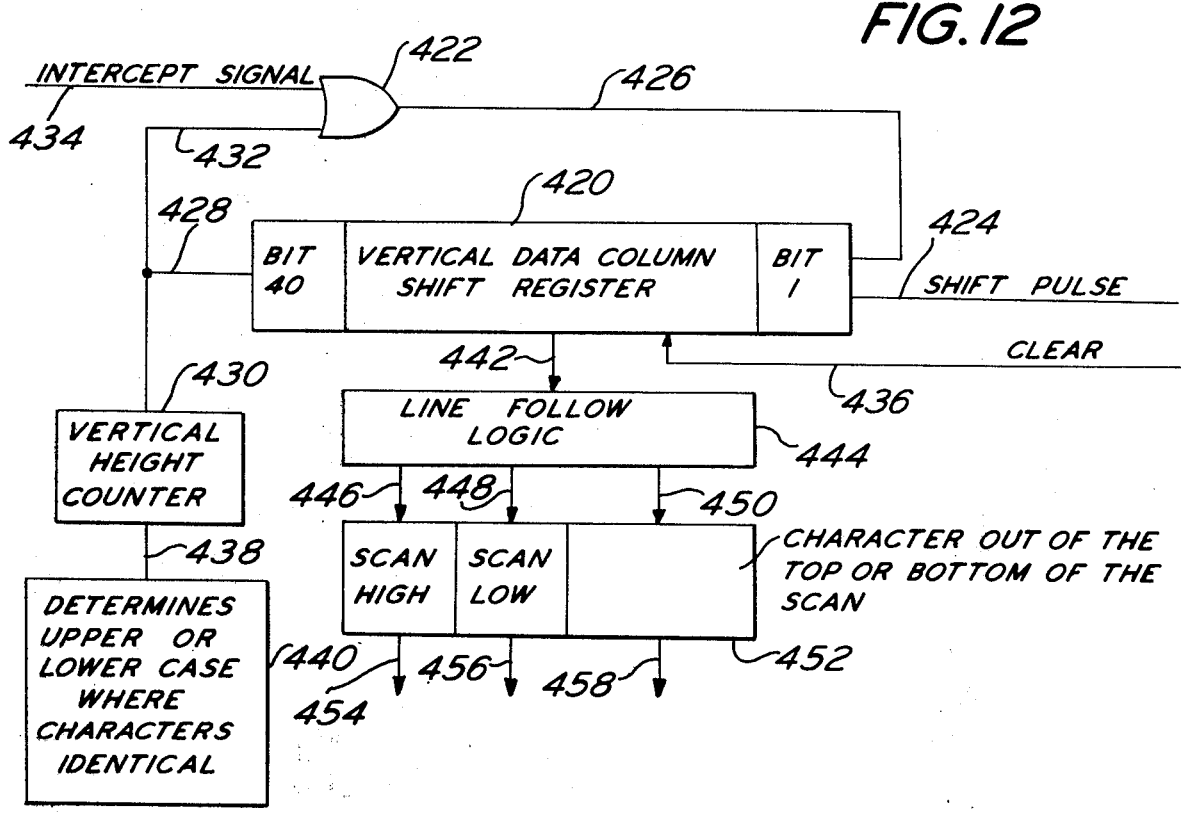
Figure 9:
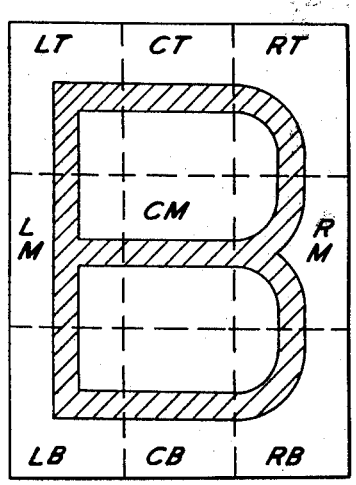
Figure 10:
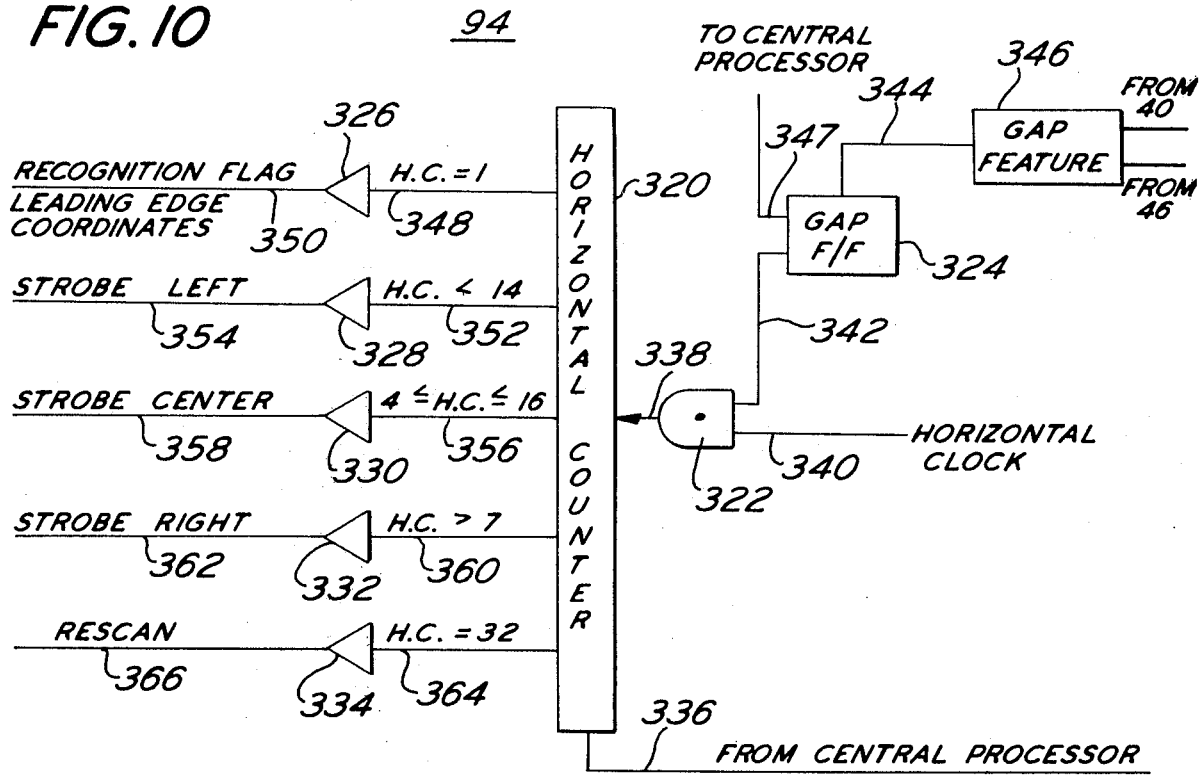
Figure 11:
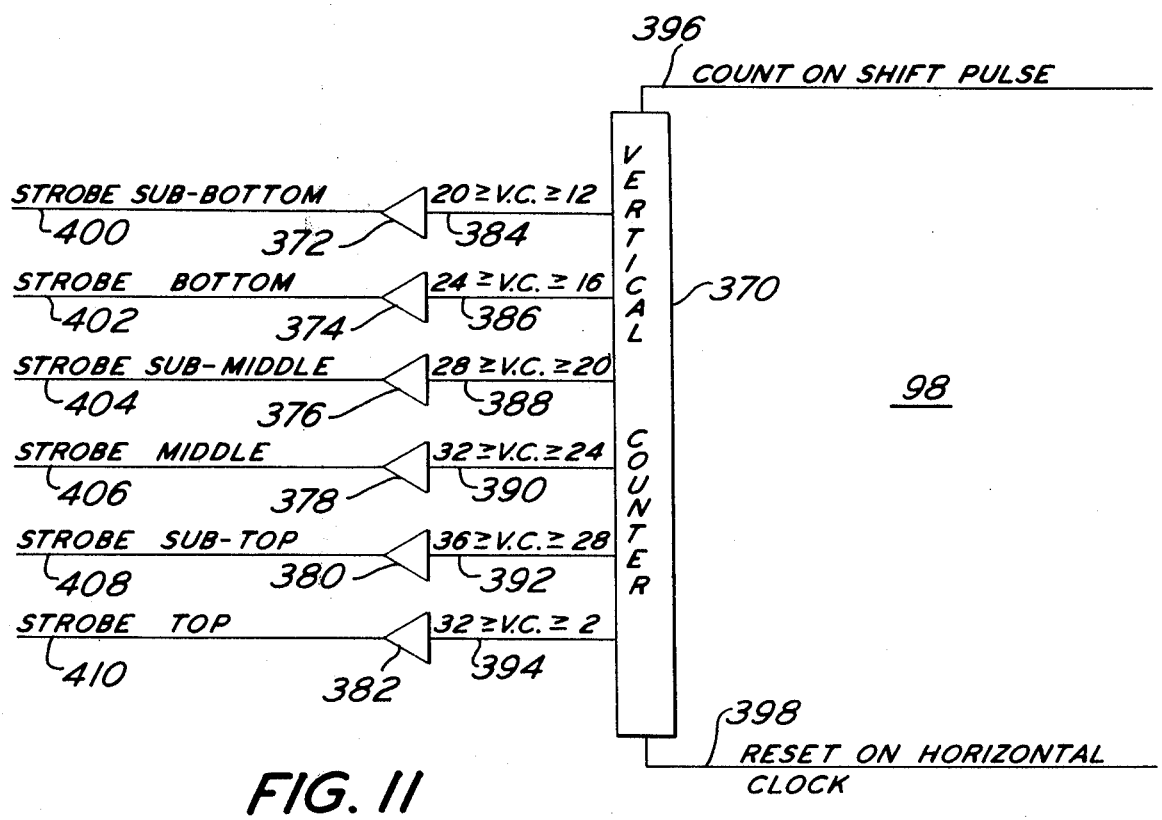
Figure 13:
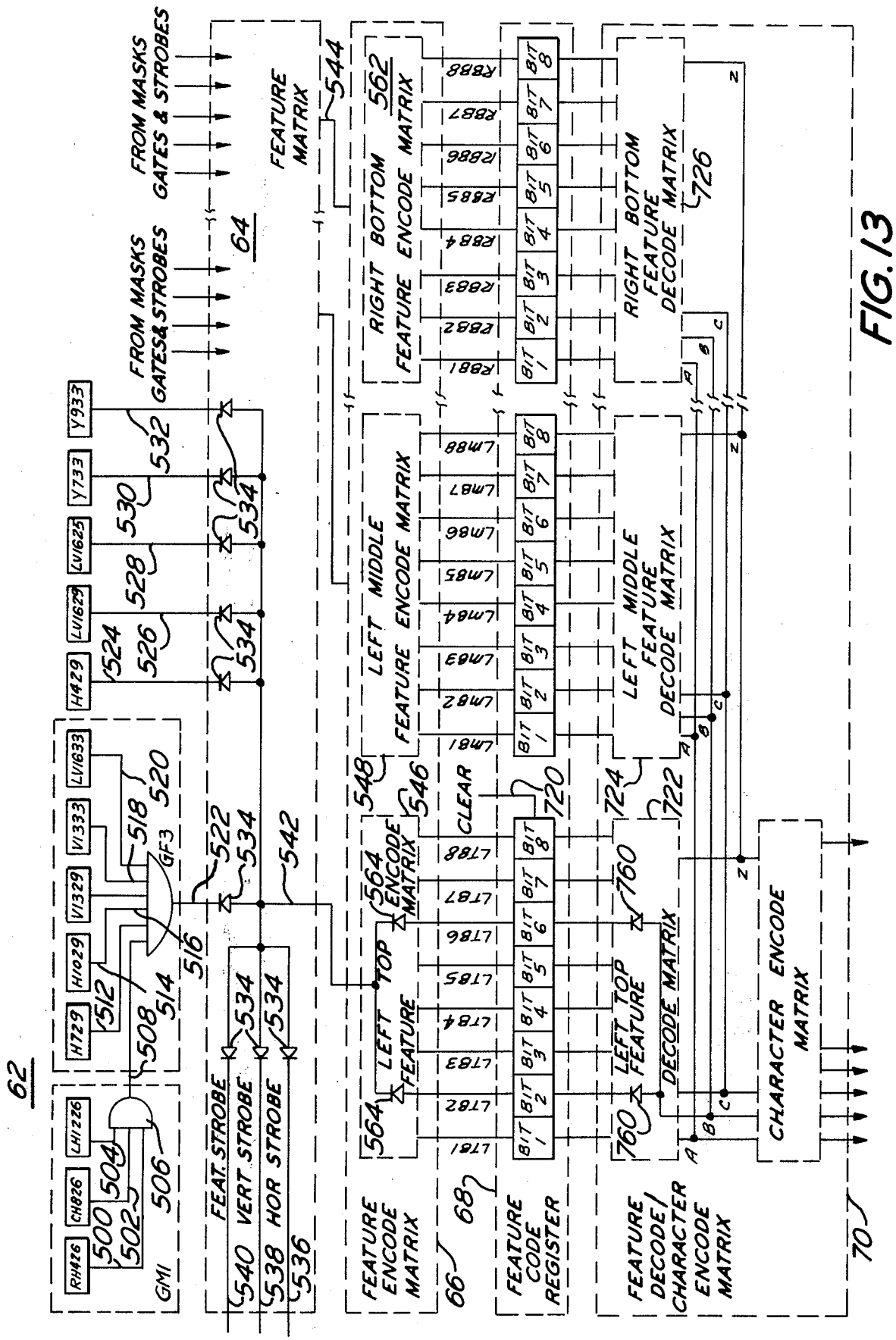
Figure 14:
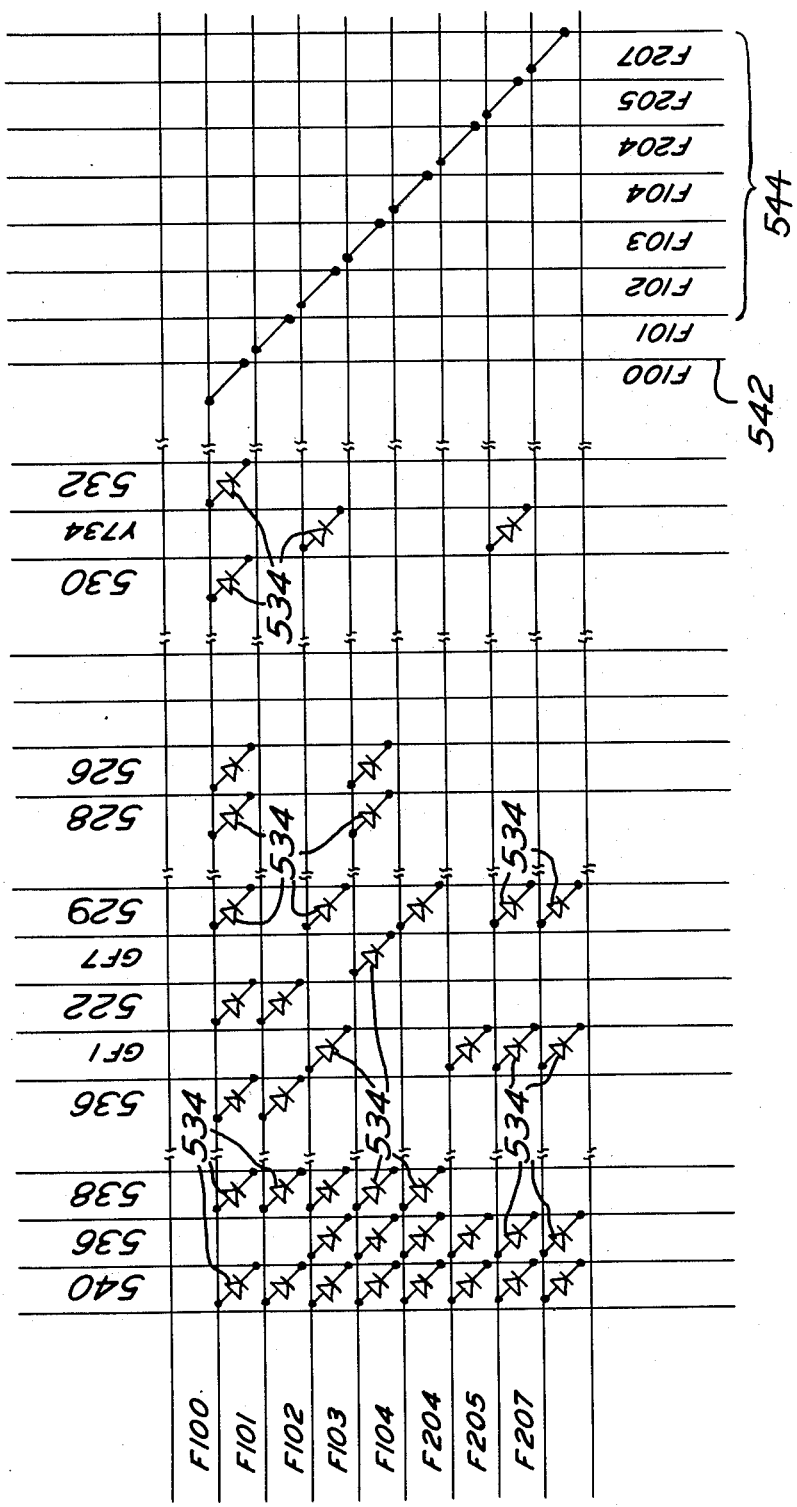
Figure 15:
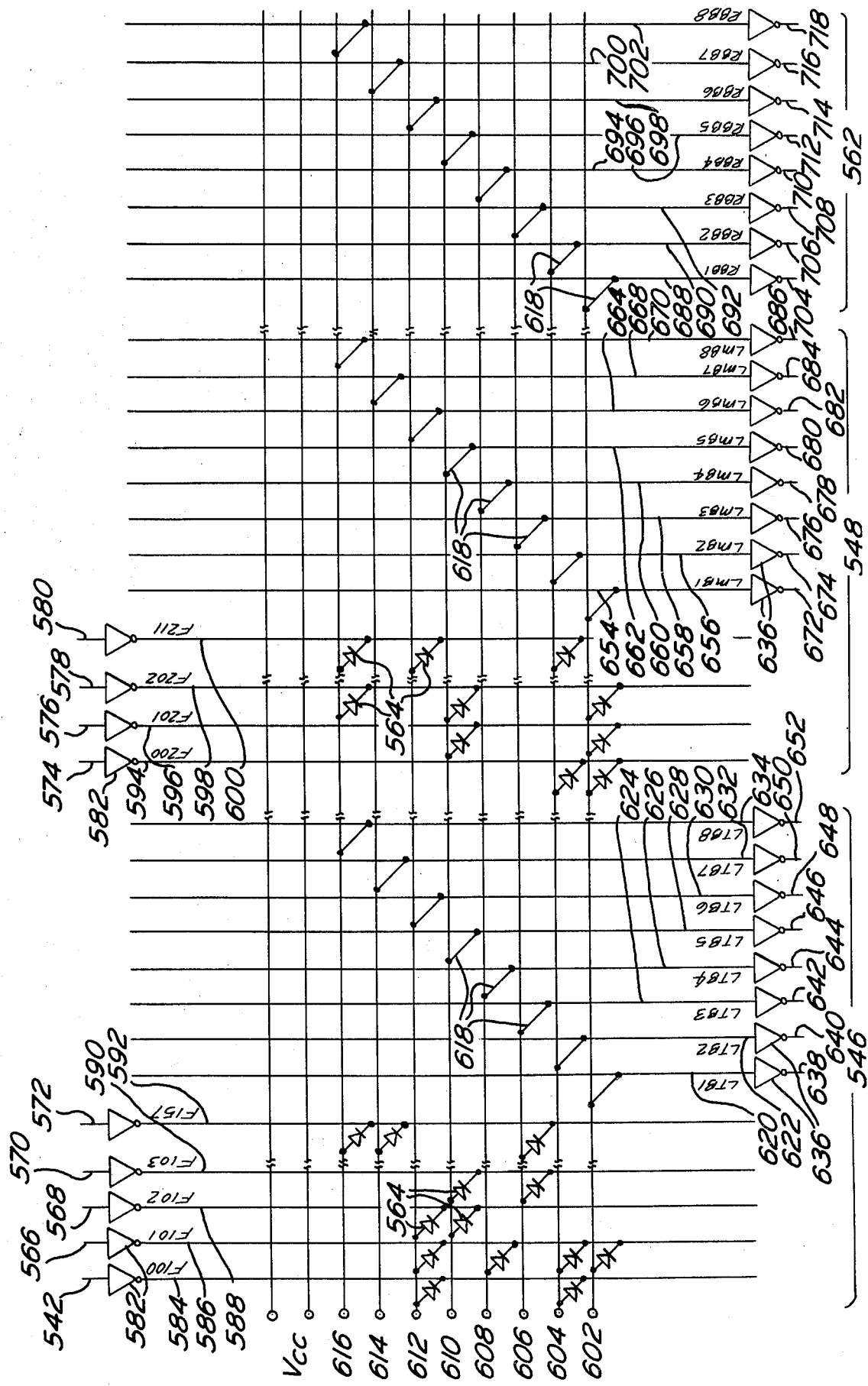
Figure 16A:
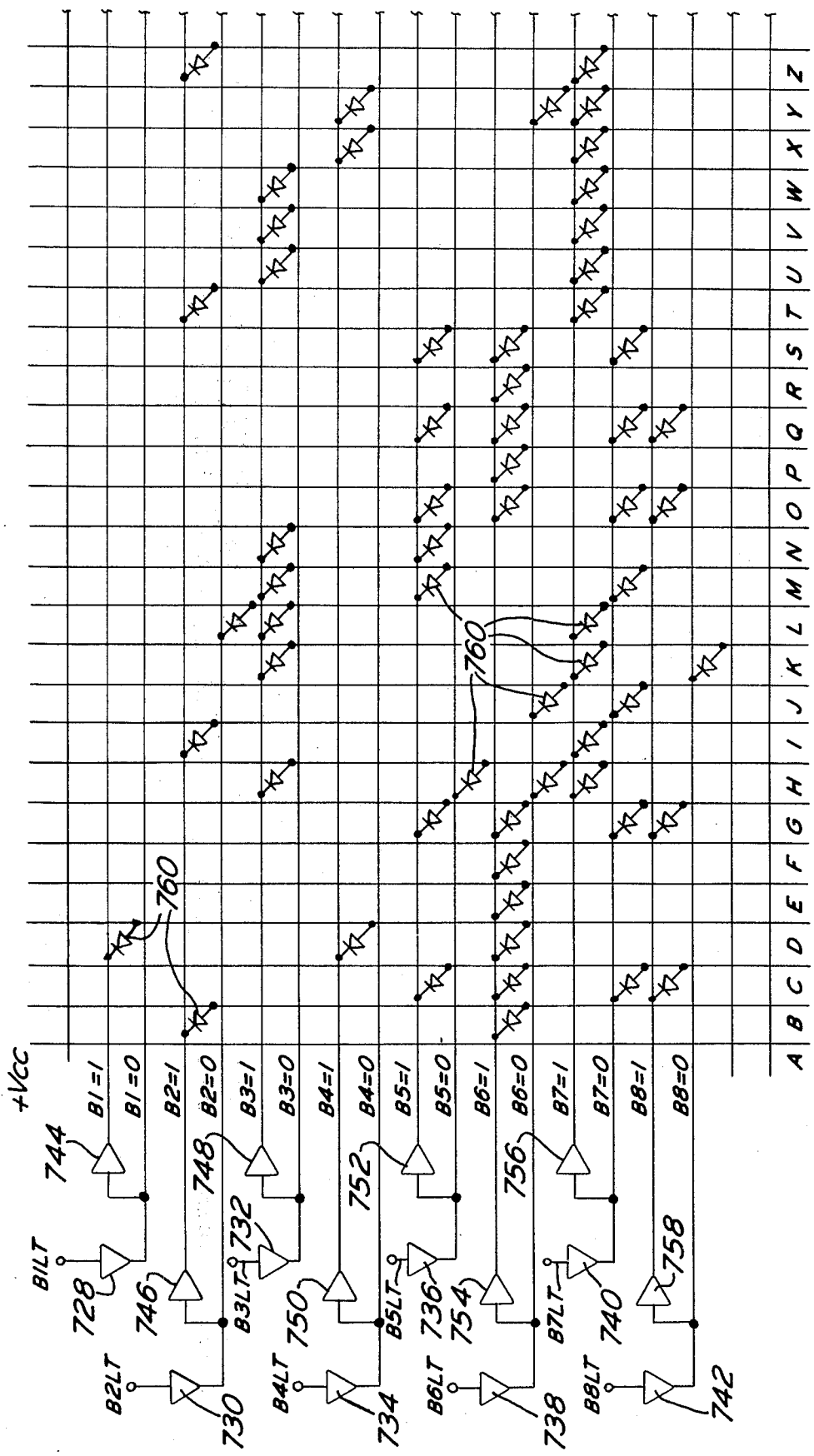
Figure 16B:
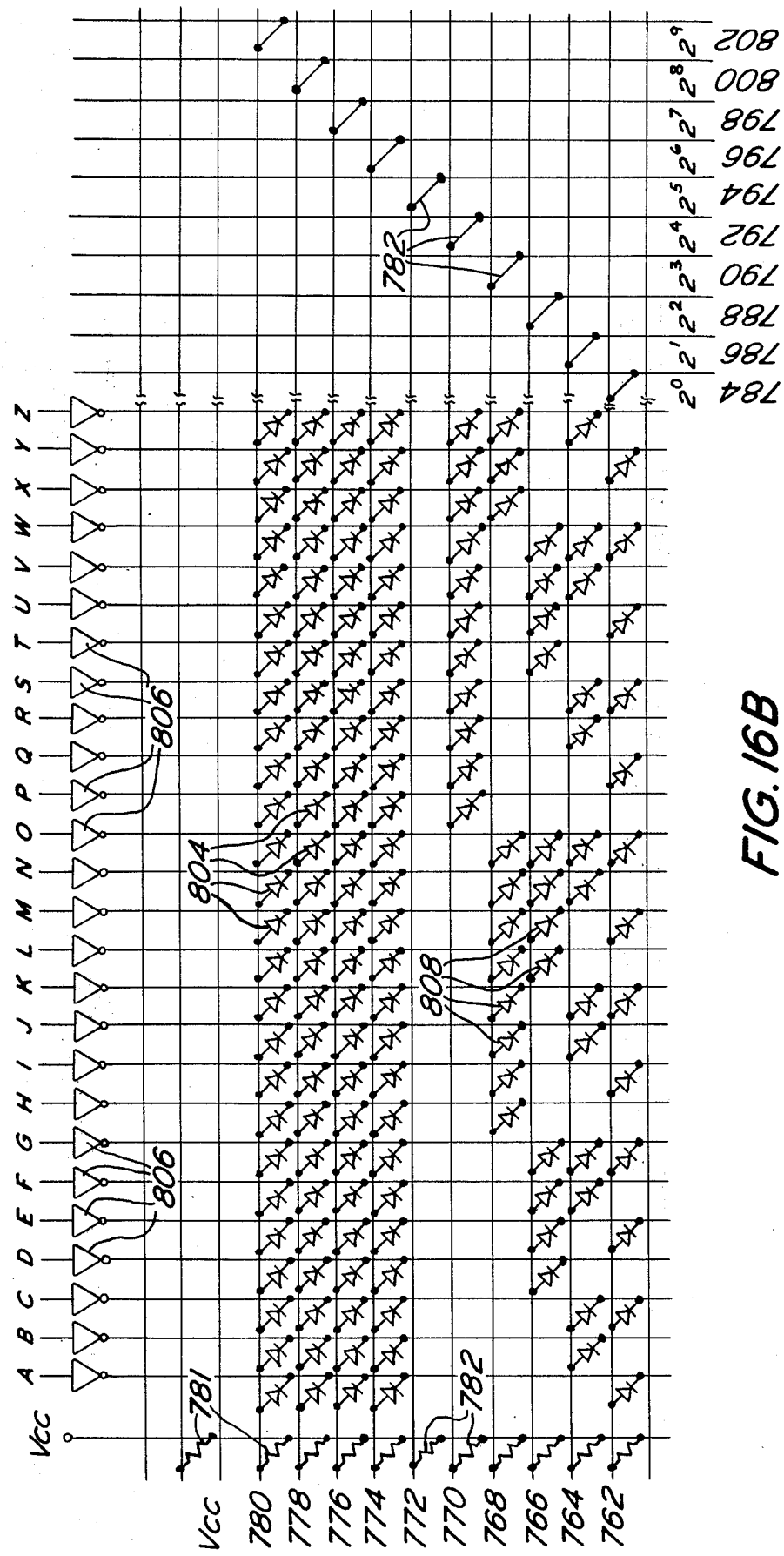

FIG. 6, comprised of FIGS. 6A through 6F, are diagrammatic representations of the sub-feature masks which are required to detect the features for the character "B";

FIG. 7 is a schematic logic diagram showing the interconnection of a positive diode mask, its associated correlator and positive mask delay circuitry;

FIG. 8 is a schematic logic diagram showing the interconnection of a negative diode mask, its associated correlator-inverter and negative mask delay circuitry FIG. 9 is a diagrammatic illustration of the character "B" shown with its associated geographic areas and a graphical representation of the nine, 8-bit feature codes representing such a character;

FIG. 10 is a combined schematic-logic diagram of the horizontal analyzer and gap logic;

FIG. 11 is a schematic diagram of the vertical analyzer;

FIG. 12 is a logic diagram of the vertical data column;

FIG. 13 is a combination schematic and functional block diagram of the portion of the system accomplishing the character recognition function via the use of feature codes;

FIG. 14 is a schematic diagram of a portion of the feature matrix shown in FIG. 13;

FIG. 15 is a schematic diagram of a portion of the feature encode matrix shown in FIG. 13; and FIG. 16, comprised of FIGS. 16A and 16B, are schematic diagrams of a portion of the feature decode/character encode matrix shown in FIG. 13.

Figure 1:
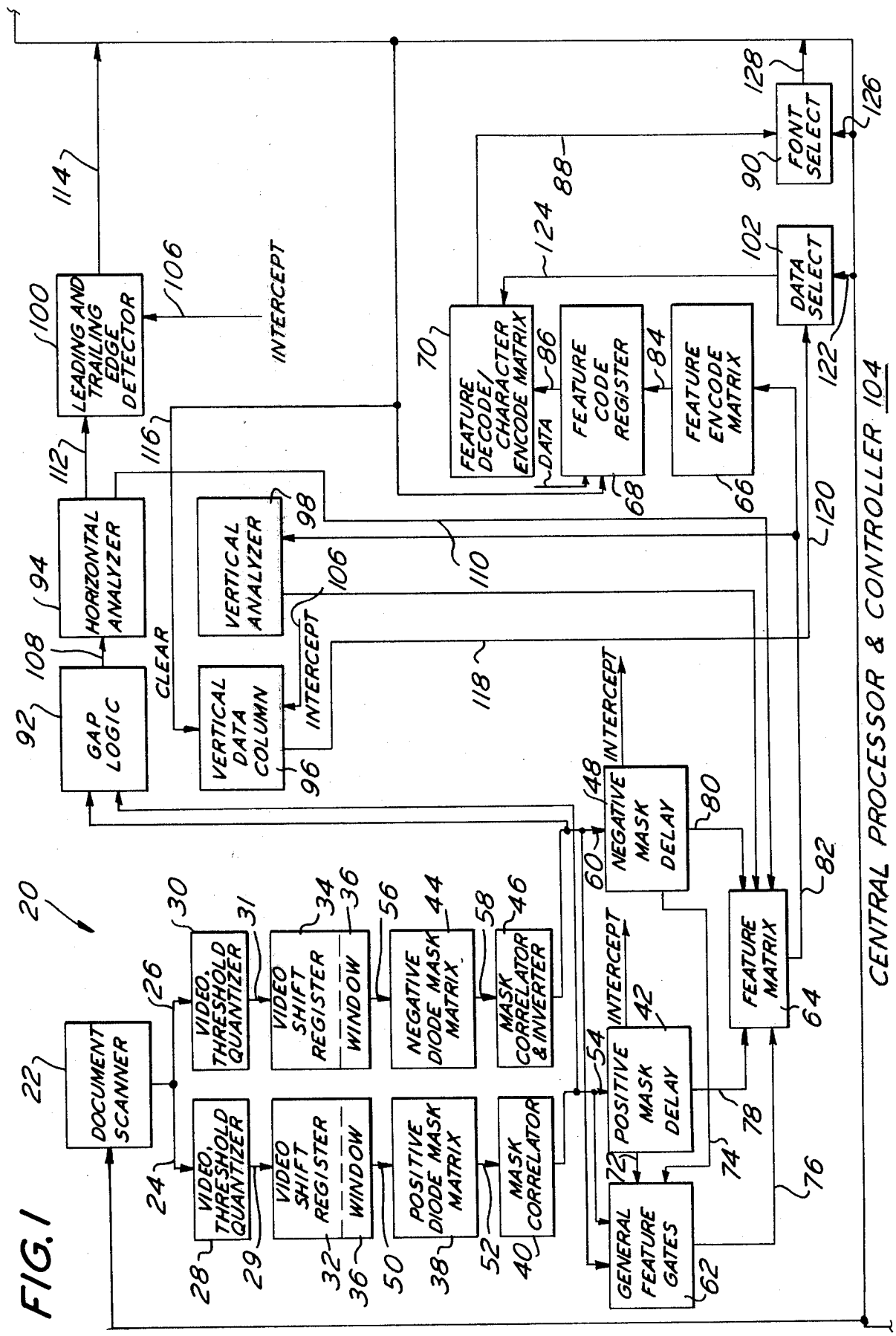
FIG. 1 is a schematic block diagram of a character recognition system embodying the instant invention.

Referring now in greater detail to the various figures of the drawing wherein like reference characters refer to like parts, a character recognition system embodying the invention is shown generally at 20 in FIG. 1. For the purposes of clarity various portions of the control circuitry associated with the various components of the system have been omitted.

The character recognition system 20 basically comprises a document scanner 22 which includes means for handling the document and means for scanning the characters on the document. A preferred embodiment of the document handler is shown in U.S. Pat. No. 3,594,549, assigned to the same assignee as the instant invention. The means for scanning the document in the document scanner 22 preferably comprises a flying spot scanner for scanning individually each of the characters provided on the document.

The output of the document scanner, which is generated by a photomultiplier therein, is provided on lines 24 and 26 and is an analog signal indicative of the video detected by the flying spot scanner.

As can be seen the output of line 24 of the document scanner 22 is connected to the input of a video threshold and quantizer circuit 28 and the output line 26 of the document scanner is connected to the input of another video threshold and quantizer circuit 30. The circuit 28 is constructed and arranged to generate binary quantized signals and is connected to a video shift register 32, referred to as the positive video shift register, via connecting line 29. The binary quantization is generated in accordance with the analog signals provided on line 24 and is provided to the threshold quantizer 28. The positive video shift register is caused by the controller to shift the binary quantized signals serially through itself at the sampling rate of the flying spot scanner. The binary quantization shifted through the positive shift register represents the detection of video above a predetermined intensity in the sampled field in accordance with the threshold level set in circuit 28, which level can be adjusted as desired.

The circuit 30 is constructed and arranged in a similar manner to circuit 28 to generate binary quantized signals and is connected to video shift register 34, hereinafter referred to as the negative shift register, via connecting line 31. The binary quantization is generated in accordance with the analog signals provided on line 26 and is provided to the threshold quantizer 30. The negative video shift register 34 is caused by the controller to shift the binary quantized signals serially through itself at the sampling rate of the flying spot scanner, and is thus in unison with the signals passing through the positive shift register 32. The binary quantization shifted through the negative shift register represents the detection of the presence of video above a predetermined intensity on the field in accordance with the threshold level set in circuit 30, which level is also adjustable and is at a lower level than the level of circuit 28.

The purpose of utilizing the two video shift registers and their associated threshold and quantizer circuits is to enable the system to be adjusted to read either degraded or heavy print. For example, when reading degraded printed material the threshold level of the circuit 28 can be adjusted to a lower level than that for reading normal print, thereby increasing the sensitivity of the system, yet the threshold level of the circuit 30 can be kept at a sufficiently high level to preclude the detection of noise. For reading heavy print the positive shift register can be "lightened", i.e., the threshold level in circuit 28 raised, while the negative shift register is kept "normal", i.e., the threshold level of circuit 30 maintained at the normal level for average darkness characters.

As seen in FIG. 1, a portion of each of the video shift registers 32 and 34 is shown within dotted lines and labeled WINDOW 36. As will be seen in great detail hereinafter, the entire character is shifted through the shift register windows and the shift register windows are the only portions of the shift registers 32 and 34 which are looked at by the circuitry for extracting the features of this invention. In accordance with the features that pass through the shift register windows, the entire character is recognized by the recognition circuitry. The recognition circuitry is arranged to detect positive features, that is character features including the presence of video, and negative features, that is character features including the absence of video. The circuitry for detecting the positive features comprise positive diode mask matrix 38, mask correlator 40 and positive mask delay 42. The circuitry for detecting the negative features comprise negative diode mask matrix 44, mask correlator 46 and negative mask delay 48.

As can be seen the output of the window of the positive shift register is provided on lines 50, which lines are connected to the input of the positive diode mask matrix 38. The output of matrix 38 is provided on line 52, which lines are connected to input of the mask correlator 40. The output of the correlator 40 is provided on lines 54, which lines are connected to the input of the positive mask delay 42. Similarly the window 36 of the negative video shift register 34 is provided on lines 56, which lines are connected to the input of the negative diode mask matrix 44. The output of the matrix 44 is provided on lines 58, which lines are connected to the input of the mask correlator 46. The output of the correlator 46 is provided on lines 60, which lines are connected to the input of the negative mask delay 48.

In addition to the foregoing, the feature extraction circuitry also comprises general feature gates 62, feature matrix 64, feature encode matrix 66, feature code register 68 and feature decode/character encode matrix 70. As can be seen lines 54 and 60 from the mask correlators 40 and 46, respectively, are also connected to inputs of the general feature gates 62. In addition other inputs are provided to the general feature gates via lines 72 from the positive mask delay 42 and lines 74 from the negative mask delay 48. The output of the general feature gates is provided on lines 76 and is connected as one input of the feature matrix 64. Another input to the feature matrix 64 is provided, via line 78, from the positive mask delay and still another input to the feature matrix is provided, via line 80, from the negative mask delay 48. The output of the feature matrix is provided on lines 82, which lines are connected to the input of the feature encode matrix 66. The output of the feature encode matrix is provided on lines 84, which lines are connected to the input of the feature code register 68. The output of the feature code register is provided on lines 86, which lines are connected to the feature decode/character encode matrix 70. The output of the feature decode/character encode matrix 70 is provided on lines 88 which lines are connected to the input of a font select circuit 90.

In addition to the circuitry heretofore described the system 20 also comprises gap logic 92, a horizontal analyzer 94, a vertical data column 96, a vertical analyzer 98, a leading and trailing edge detector 100 and a data select circuit 102. Finally, a central processor and controller 104 is provided and is interrelated with each of the components of the system 20 in order to provide the necessary control signals for the flow of data throughout the system.

As can be seen, lines 54 and 60, the outputs of the mask correlators 40 and 46, respectively, are connected to the inputs of the gap logic 92. This circuitry serves to detect actual gap between characters and to determine when one character ends and the next begins.

The vertical data column 96 provides a height count to give an indication of upper or lower case characters. One input to circuit 96 is provided from line 106 which is connected to a portion of the controller and another input to the circuit is provided from line 116 which is connected to the leading and trailing edge detector 100. Another output of the vertical data column is provided on line 120 which is connected to an input of the data select circuit 102. Another input to the data select circuit is provided via line 122 from the controller in the central processor 104.

The data select circuit is arranged to enable or disable the recognition of specific classes of characters, e.g., all numerics, all upper case alphabet characters, etc. To that end, the output of the data select circuit 102 is provided via lines 124 to the feature decode/character encode matrix 70.

The output of the gap feature logic is provided on line 108 and is connected to the horizontal analyzer 94. One output of the horizontal analyzer is provided along lines 110 and is connected to the input of the feature matrix 64 to indicate the horizontal portion of the character which is in the shift register window. Another output of the horizontal analyzer is provided by lines 112 and is connected to the input of the leading and trailing edge detector 100. Another input to the leading and trailing edge detector is provided via line 106 from a portion of the controller.

The leading and trailing edge detector 100 receives information via lines 112 and 106 in order to determine the coordinates of the leading and trailing edges of the character, which information is provided on one output line 114. Line 114 is connected as an input to the central processor 104. Another output of the leading and trailing edge detector is provided on line 116 and is connected to one input of the feature code register 68. Upon the detection of the trailing edge of a character the controller issues a "clear" signal on line 116 to clear the vertical data column 98 and the feature code register 68.

The vertical analyzer 98 provides an output on lines 118 which is connected to the input of the feature matrix 64 to provide the feature matrix with information as to the vertical portion of the character passing through the window.

Another input to the font select circuit 90 is provided from the central processor 104, via line 126. The font select circuitry is operative for determining whether the character recognized by the circuit 70 is in the font selected by the central processor, if so the font select circuitry enables a signal from the circuit 70, indicating the recognition of the character, to be provided via line 128 to the central processor.

As will be seen in detail later the diode mask matrices 38 and 44 comprise diode sub-feature masks which are connected, via lines 50 and 56, to the windows of the shift registers 30 and 34, respectively, in order to provide combinatorial determinations of the presence and the absence of sub-features for use in determining the features which are present in shift register windows. The mask correlators 40 and 46 serve to establish how much of a sub-feature can be missing yet still enable the recognition of a feature.

The character recognition circuitry of the instant invention comprises, the diode masks 38 and 44, the mask correlators 40 and 46, the mask delay circuits 42 and 48, the general feature gates 62, the feature matrix 64, the feature encode matrix 66, the feature code register 68 and the feature decode/character encode matrix 70.

As will be described in detail later the positive diode masks are coupled to the window of the positive video shift register and the negative diode masks are coupled to the window of the negative video shift register in order to detect the presence of certain predetermined sub-features. The sub-features are established by diodes connected as logic gates to the outputs of the shift register in the window. The output of each diode mask is provided to an associated mask correlator which determines if a sufficient number of sub-feature masks within the window are satisfied to enable the recognition of the sub-feature. The output of the correlators are provided to respective mask delay circuits which serve to duplicate portions of the mask to thereby effect the expansion of the window into an enlarged or "apparent" window to permit the detection of a larger portion of a feature of the character being scanned.

The output of the correlator and mask delay circuits are provided as inputs to the general feature gates 62 to create predetermined high usage masks (mask shapes used in various features). That is, certain sub-features or combination of features are formed from the mask correlators and the mask delay circuits only once and, via the use of AND gates, are fed to as many inputs in the feature matrix as are required for the recognition of each of the features in which sub-features or combined sub-features are utilized. This obviates the necessity of connecting a separate diode mask each time a high usage mask is needed.

The feature matrix is composed of a plurality of diodes and is arranged to convert the input signals provided to it, that is the signals indicating the recognition of various sub-features or combinations of sub-features within the apparent window, into single node output signals indicative of the recognition of a certain feature. Each single node output signal of the feature code matrix is geographically oriented to indicate the recognition of a feature within a respective geographical area on the character. As shown in FIG. 9 in a preferred embodiment of this invention each character is broken into nine geographic areas, namely, left-top, left-middle, left-bottom, center-top, center-middle, center-bottom, right-top, right-middle and right-bottom.

In order to effect the detection of a feature within a particular geographic area the feature matrix is provided with input signals, called "strobes", from the horizontal analyzer, indicating the horizontal position of the character within the video shift registers, and the vertical analyzer, indicating the vertical position of the character within the video shift registers. The feature matrix utilizes the strobe signals to enable the detection of the geographically oriented features only during the interval that such a portion of the character is in the apparent window. For example, the horizontal and vertical strobes disable the matrix 64 from detecting the left-top features of the character at all times other than the period in which the left-top portion of the character is passing through the apparent window, while enabling it during such a period. The feature matrix is constructed such that it includes nine portions, each portion being associated with one of the nine geographic areas of each character, namely, left-top, left-middle, left-bottom, center-top, center-middle center-bottom, right-top, right-middle and right-bottom in order to provide signals indicating the recognition of predetermined features within each of said areas.

The output signals from the feature matrix 64, which indicate the recognition of features within the geographic areas, are provided to the feature encode matrix 66. The feature encode matrix takes the single node outputs from each of the geographic areas and decodes such signals into nine, 8-bit binary codes, one such code for each geographic area. The bits of each code are arranged to indicate a certain characteristic of the detected feature. For example, as shown in FIG. 9 the first bit of the code indicates if a feature includes an intersection or a serif, the second bit indicates if the feature includes a horizontal component, the third bit indicates if the feature includes a vertical component, the fourth bit indicates if the feature includes a diagonal component, the fifth bit indicates if the feature includes an angle, the sixth bit indicates if the feature includes a corner, the seventh bit indicates if the feature includes a line end and the eighth bit serves as a separator bit to distinguish features having similar components, e.g., components having the same shape but extending in different directions.

The nine, 8-bit binary codes from the feature encode matirx 66 are provided as parallel inputs to the feature code register 68. The register includes parallel outputs and serves to store each of the codes therein while providing such codes at its outputs until a character is recognized. The outputs of the feature code register are provided as inputs to the feature decode/character encode matrix 70. This matrix is composed of plural diodes and includes portions arranged to monitor the outputs of the feature code register to decode the nine, 8-bit codes in said registers into an output signal indicative of the character having the features indicated by the binary code.

As will be seen later, by utilizing the feature codes and associated coding and decoding matrices a feature change or the introduction of a new feature into the system in order to recognize a new character is merely a matter of diode placement within the feature decode matrix. Accordingly, such changes can be effected, easily, quickly and inexpensively and do not require the alteration or the adding of numerous hard wire connections and flip-flops as is the case with prior art systems.

The feature decode matrix is a portion of the feature decode/character encode matrix 70 and includes plural single node outputs, one such output being provided for each character the system is arranged to recognize. Accordingly, upon the recognition of a character by the feature decode matrix, the output node associated with the character having such features, (such a node being referred to as a character line), is provided with a signal thereon indicative of the recognition of the character. Each character line is connected as an input to the character encode matrix portion of the feature decode/character encode matrix 70. The character encode matrix serves to encode the single node signals indicating the recognition of the associated character into a serial binary code which the central processor can utilize. To that end, the binary code provided by the feature decode/character encode matrix is provided to the font select circuit 90. If the character recognized is in the font as selected by the circuit 90 under the control of the central processor 104 the binary signal indicative of the character is enabled to pass through the font select circuit and to the central processor via line 128.

Figure 2A:
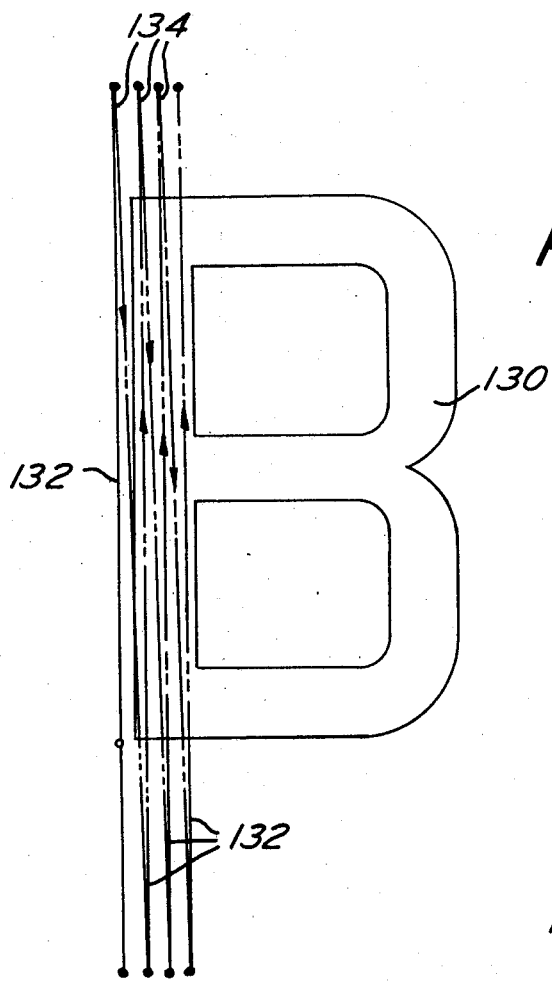
FIG. 2A is a diagrammatic illustration of a scanning pattern sampling a character on a document.

The scanning of a character is diagrammatically illustrated in FIG. 2A wherein the character "B", denoted by reference numeral 130, is shown on a document as it is being scanned by a flying spot scanner. The path that the flying spot scanner traverses on the document is represented by the solid lines 132 which include upwardly extending arrow heads to indicate the direction of movement of the flying spot scanner along the document.

The lines 134, which are shown in phantom, indicate the return path of the flying spot scanner after each scan line 132 has been completed. The video threshold and quantizers 28 and 30, in combination with the video shift registers effectively sample the signal from the document scanner forty times for each line 132 that it traverses along the document. That is, the output of the photomultiplier is quantized and the output thereof inserted into each video shift register forty times as the beam from the flying spot scanner makes one vertical stroke. The length of the strokes of the flying spot scanner are so normalized that the entire length of an upper case character 130 is the length of approximately 25 samples along the vertical stroke.

The character is also so located within the scan raster of the flying spot scanner that approximately ten samples along the vertical scan lines are taken below the character and five samples are taken above the top of the character. It should be noted that the lines 132 of the scan raster progress from a point which is to be left and below the character to be scanned and wind up at a point which is to the right of and above the end of the character. The character recognition equipment includes masks and associated matrices for detecting the portions of characters which are disposed below the normal bottom edge of a line of characters such as the lower portions of the lower case characters g, p and y. To that end the logic of the system determines that the sub-bottom features are present and does not lower the scan raster with respect to the characters provided in a line. Thus, the bottommost edge of such a character would not be spaced within the raster so that the lowermost edge is ten samples above the bottommost portion of the scan raster.

Figures 3, 4:
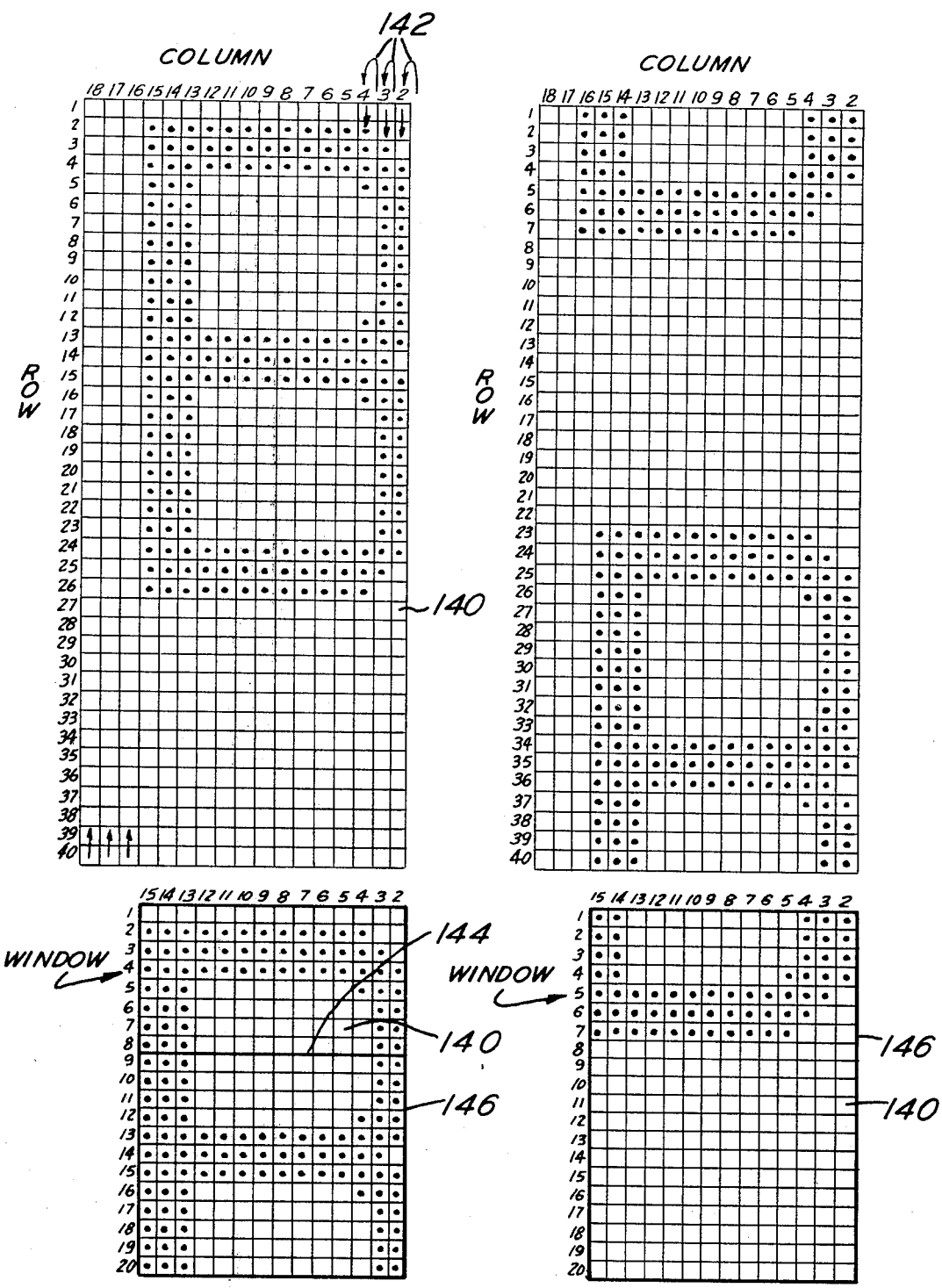
FIG. 3 is a diagrammatic illustration of a quantized character pattern being shifted through the video shift registers of the instant invention.
FIG. 4 is a diagrammatic illustration of the quantized character pattern moving into position in the video shift register for the detection of the top-left feature thereof.

It should also be noted that the sequence of the quantized samples provided from the quantizers to the video shift registers should be in the order of samples taken along lines 132 in FIG. 3. However, the scan raster need not follow lines 132.

In FIG. 5 there is a schematic diagram of a video shift register, which shift register represents both the positive video shift register 32 and the negative video shift register 34. As can be seen therein the video shift register comprises 32 MOS shift registers 136, each shift register including forty stages. The 32 shift registers 136 are connected in series with each other, with the output of the 40th bit of one register being connected to the input of the first bit of the immediately succeeding register. The input to the first bit of the first serially connected register 136 in the positive video shift register 32 is provided, via line 31 from the video threshold and quantizer circuit 28. Similarly the input to the first bit of the first shift register 136 in the negative video shift register 34 is provided via line 33 from the video threshold and quantizer circuit 30. The window 36 in each of the shift registers 32 and 34 is provided via fourteen, 8-bit shift registers 138 since the 32 serially connected shift registers are formed of MOS chips and are only accessible at their last stage, i.e., bit 40.

Each of the shift registers 138 is caused by shift pulses to shift an input signal provided on line 140 through its eight successive stages at the same rate that the binary quantization is shifted through shift registers 136. As can be seen in FIG. 5 bit one of the first window shift register 138 is connected via line 140 to bit 40 of the first shift register 136. In a similar manner the first bit of the second window shift register 138 is connected via line 140 to the 40th bit of the second shift register 136, the first bit of the third window shift register (not shown) is connected via a line (not shown) to the 40th bit of the third shift register 136, the first bit of the fourth window shift register (not shown) is connected via a line (not shown) to the 40th bit of the fourth MOS shift register, the first bit of the fifth window shift register (not shown) is connected via a line (not shown) to the 40th bit of the fifth MOS shift register (not shown), the first bit of the sixth window shift register (not shown) is connected via a line (not shown) to the 40th bit of the sixth MOS shift register (not shown), the first bit of the seventh window shift register (not shown) is connected via a line (not shown) to the 40th bit of the seventh MOS shift register (not shown), the first bit of the eighth window shift register (not shown) is connected via a line (not shown) to the 40th bit of the eighth MOS shift register (not shown), the first bit of the ninth window shift register (not shown) is connected via a line (not shown) to the 40th bit of the ninth MOS shift register (not shown), the first bit of the 10th window shift register (not shown) is connected via a line (not shown) to the 40th bit of the tenth MOS shift register (not shown), the first bit of the eleventh window shift register (not shown) is connected via a line (not shown) to the 40th bit of the eleventh MOS shift register (not shown), the first bit of the twelfth window shift register (not shown) is connected via a line (not shown) to the 40th bit of the 12th MOS shift register (not shown), the first bit of the 13th window shift register 138 is connected via a line 140 to the 40th bit of the thirteenth shift register 136 and the first bit of the 14th window shift register 138 is connected via line 140 to the 40th bit of the 14th shift register 136.

The eight bits stored within the first window shift register 138 correspond to the bits of information within the first eight stages of the second shift register 136. Similarly the second window shift register serves to store the bits of information corresponding to the bits within the first eight stages of the third MOS shift register (not shown), the third window shift register (not shown) serves to store the bits of information corresponding to the bits within the first eight stages of the fourth MOS shift register (not shown), the fourth window shift register (not shown) serves to store the bits of information corresponding to the bits within the first eight stages of the fifth MOS shift register (not shown), the fifth window shift register (not shown) serves to store the bits of information corresponding to the bits within the first eight stages of the sixth MOS shift register (not shown), the sixth window shift register (not shown) serves to store the bits of information corresponding to the bits within the first eight stages of the seventh MOS shift register (not shown), the seventh window shift register (not shown) serves to store the bits of information corresponding to the bits within the first eight stages of the eighth MOS shift register (not shown), the eight window shift register (not shown) serves to store the bits of information corresponding to the bits within the first eight stages of the ninth MOS shift register (not shown), the ninth window shift register (not shown) serves to store the bits of information corresponding to the bits within the first eight stages of the 10th MOS shift register (not shown), the 10th window shift register (not shown) serves to store the bits of information corresponding to the bits within the first eight stages of the 11th MOS shift register (not shown), the eleventh window shift register (not shown) serves to store the bits of information corresponding to the bits within the first eight stages of the twelfth MOS shift register (not shown), the twelfth window shift register (not shown) serves to store the bits of information corresponding to the bits within the first eight stages of the 13th MOS shift register 136, the 13th window shift register 138 serves to store the bits of information corresponding to the bits within the first eight stages of the 14th MOS shift register 136 and the 14th window shift register 138 serves to store the bits of information corresponding to the bits within the first eight stages of the fifteenth MOS shift register 136. In addition to storing the bits, each of the window shift registers include eight output lines, each associated with a respective bit or stages therein. The output lines are shown by the arrows, and as will be described later provide the real window to which the mask matrices are connected.

Now referring to FIGS. 3 and 4, it can be seen that columns 2 through 18 and rows 1 through 40 of the video shift registers 28 and 30 are diagrammatically illustrated by the boxes 140, each of which represents one of the stages of the video shift registers. As should be appreciated each column of bits represents the bits within a respective MOS shift register 136. For example column 2 represents the forty bits in the second MOS shift register 136. The quantized binary signal is shifted through the second through eighteenth columns of the shift register in the directions of the arrows 142. As can thereafter be seen that the information travels down column 2 from row 1 to row 40, progresses up to row 1 of column 3 and down column 3 until it reaches the fortieth row. The information is then shifted into the first row of column 4 and so on until the information in the register is shifted out the fortieth row of the 18th column. In actuality the information continues to be shifted through a total of 32 columns.

The boxes 140 which are shown in blank in FIG. 3 represent video shift register stages that have a quantized binary signal representative of a white area of the document being scanned. The boxes which have a dot in the center thereof represent a shift register stage which has the quantized binary signal indicative of a black area being scanned. Thus, the blank boxes 140 can be considered to represent a "zero" in the shift register stage and the boxes with the dot therein represent a "one" in the shift register stage.

The shift register window 36 is formed by the one-hundred twelve bits provided by the fourteen, 8-bit window shift registers 138. The window 36 is referred to as real or actual window in that it is provided by the window shift registers 138 and represents the first eight stages in each column (such registers being represented by boxes 140 which are provided within the boundary of the thick line 144 shown in FIGS. 3 and 4). To that end line 144 represents the periphery about the stages of the video shift register which are in columns 2 through 15 and are within rows 1 through 8. Thus, the real window is fourteen stages wide by eight stages high. As will be seen in detail later the "real" window is expanded into an "apparent" window of fourteen stages wide by twenty stages high through the use of the associated mask delay circuits 42 and 48. To that end the apparent window comprises the specific stages of the video shift register which are represented by boxes 140 and which are provided within the boundary of the thick solid line 146. As can be seen the line 146 provides a periphery about the stages of the video shift register which are in columns 2 through 15 and within rows 1 through 20.

In FIG. 3, the video shift register is illustrated with the binary quantization of the left side of a "B" shown as it is stored in the video shift register during one instant as it passes therethrough. The outline of the upper case character "B" takes shape in the form of the stages that are in the "1" state indicating that a quantized signal representative of a black portion on the document has been scanned. The stages in the shift register thereby correspond to a specific portion of the field of the document that has been scanned when the number of times that the character pattern has been shifted into the register is divisible by forty. That is, as seen in FIG. 3, the shift register corresponds to the area in the field that has been scanned since the bottom edge of character "B" is in row 26, which is greater than ten samples or rows above the bottom of the scan raster.

The left side of the character B is illustrated within the shift register as the left-center portion of the character B is being shifted through the apparent window of the shift register. Referring now to FIG. 4, the shift register is diagrammatically shown twenty-one shifts of the binary quantized pattern in the shift register after the position shown in FIG. 3. Thus, as can be seen, the lower left-hand corner of the character B is progressing through the window for recognition. It should thus be appreciated that as the character progresses through the shift register, all of the features in the character are at some time within the apparent shift register window.

Figure 2B:
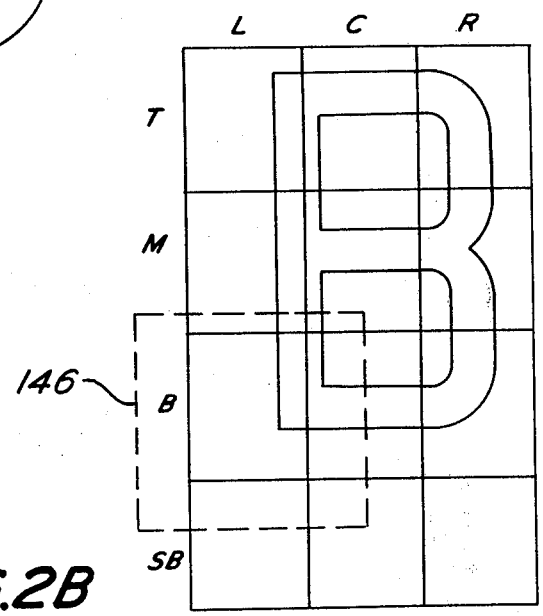
FIG. 2B is a diagrammatic representation of a character on the field of a document showing geographic areas defined on said character.

The scan of a field of a character is graphically illustrated in FIG. 2B which depicts a field on a document which has been divided into twelve zones. The zones are in three columns which are depicted as left, center and right and are labeled as "L", "C" and "R", respectively. The zones are also segmented in the four rows which are respectively, the top, middle, bottom and sub-bottom rows which are labeled as "T", "M", "B" and "SB", respectively. In order to be consistent with the earlier drawings, the upper case character "B" is illustrated on the field of the relationship in which it would be scanned within a field. The dotted line denoted as 146 corresponds to the apparent window of the shift register. As can be seen the apparent window is actually larger than the zones of the field. In addition, the window, can be considered to move about the field in the same direction as the beam of the flying spot scanner progresses along lines 132 in FIG. 2. In reality, as shown in FIGS. 2A and 3, the binary quantized character pattern is shifted through the shift register and causes the feature in the quantized character pattern to be shifted through the window.

As in the U.S. Pat. No. 3,613,080, referred to previously, the features within the character such as the lower left-hand corner, the upper left-hand corner, the middle of the left-hand side are each detected individually and independently of each other. That is, since the entire character is not examined simultaneously, the individual features in the character are recognized independently of each other. This sequential detection of features within the character enables greater power of recognition because the features are detected in a character and are not dependent on each other.

For example, if one upper case character B has a much larger bottom loop than top loop and a second upper case character B has an equal sized upper loop and lower loop a system that requires the simultaneous detection of features would not be able to recognize both of these characters B as the character B since the relationship in space between the top left-hand corner of the character B, the lower left-hand corner of the B and the center left side of the B would be differently spaced in relationship to each other. It can also be seen that the only difference between the upper case character B and the character numeral 8 are in the left side features of the character. Where there is simultaneous examination of each of the features, the exact spacing between the top left-hand corner, the bottom left-hand corner and the middle-left side of these characters becomes critical. However, where there is not dependence on the distance between each of these features, each of the features can be detected independently of each other, thereby enabling relative size and thickness of line spacing between the features to be irrelevant in the detection thereof.

By the provision of a window which is larger than each of the individual zones of a field, the feature can be looked for in great detail yet vary in size with respect to the other features of the character. This is extremely important in proportional space typing wherein many letters take on different widths because of the sqeezing and enlarging of the characters to fit within predetermined lengths of lines. Thus, even a book or publication such as a newspaper can be utilized in the character recognition system disclosed herein since there is not a requirement of simultaneous detection of features. Thus, the spacing of V-shaped features in a wide "W" or narrow "W" in a proportional type system would cause no difficulty in the detection and recognition of the fact that a character "W" has been scanned.

Each feature in a character is detected by examining the combination of various white and black areas on the document simultaneously. These white and black areas on a document are detected by the positive diode mask matrices and the negative diode mask matrices, 38 and 44, respectively. Each feature is detected by requiring the simultaneous detection of a predetermined combination of sub-feature mask.

FIGS. 6A through 6F are diagrammatic illustrations of the sub-feature masks which are utilized to detect the features of the character B in the left-top, left-middle, left-bottom, right-top, right-middle and right-bottom geographic areas thereof, respectively.

Each of the diode masks shown in FIG. 6 are produced via the use of the mask matrices 38 and 44, the mask correlators 40 and 46, the mask delays 42 and 48 and the general feature gates 62.

FIG. 6A is a diagrammatic representation of the sub-feature masks which are necessary to detect the feature, denoted as feature F100, in the left-top geographic area of the upper case B. To that end FIG. 6A represents a portion of the apparent window comprising columns 2–15 and rows 1–20. The boxes in each of the rows correspond to the stages of the shift registers making up columns 2–15 and rows 1–20.

It can therefore be seen that the detection of feature F100 requires the satisfaction of sub-feature masks LV1625, LV1629, LV1633, V1329, V1333, H1029, H729, H429, Y933, Y733 and GM1. As will be seen in detail later GM1 represents a mask formed in the general gate 62.

The shaded masks (i.e., those masks shown with cross-hatchings therein) represent negative masks which are provided to detect a white area on the document and the masks which are blank (i.e., those having no cross-hatching) represent prositve masks (i.e., masks which detect black areas on a document).

Figure 6B:
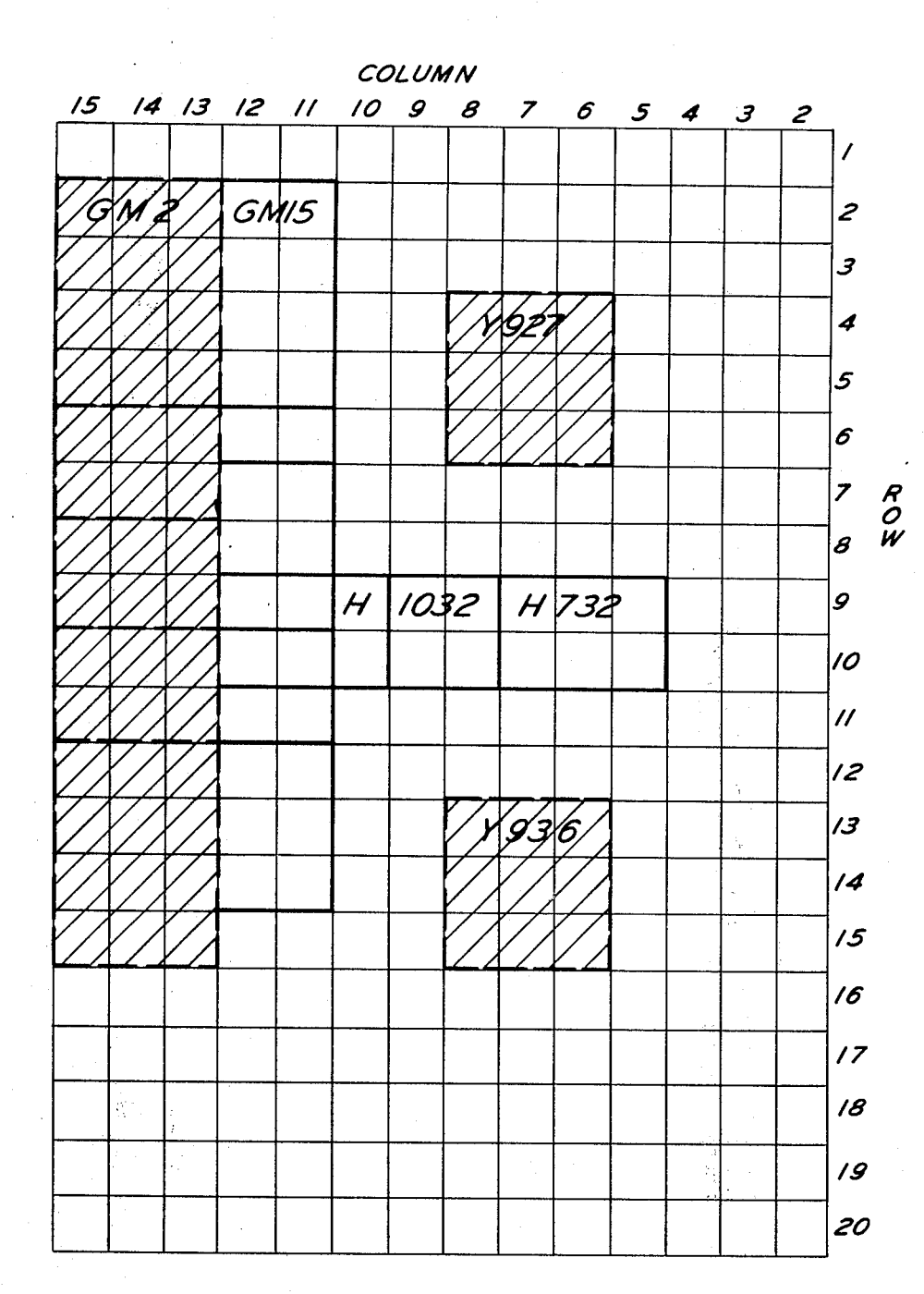

The sub-feature masks in FIG. 6A include within the boundaries thereof each of the boxes which correspond to the stages of the shift register that said masks are associated with. In FIG. 6B the sub-feature masks for the left-middle portion of the upper case B are shown within the same portion of the apparent window shown in FIG. 6A and comprises GM2, GM15, Y927, H1032, H732 and Y936. The masks in FIG. 6B represent feature F200.

Figure 6C:
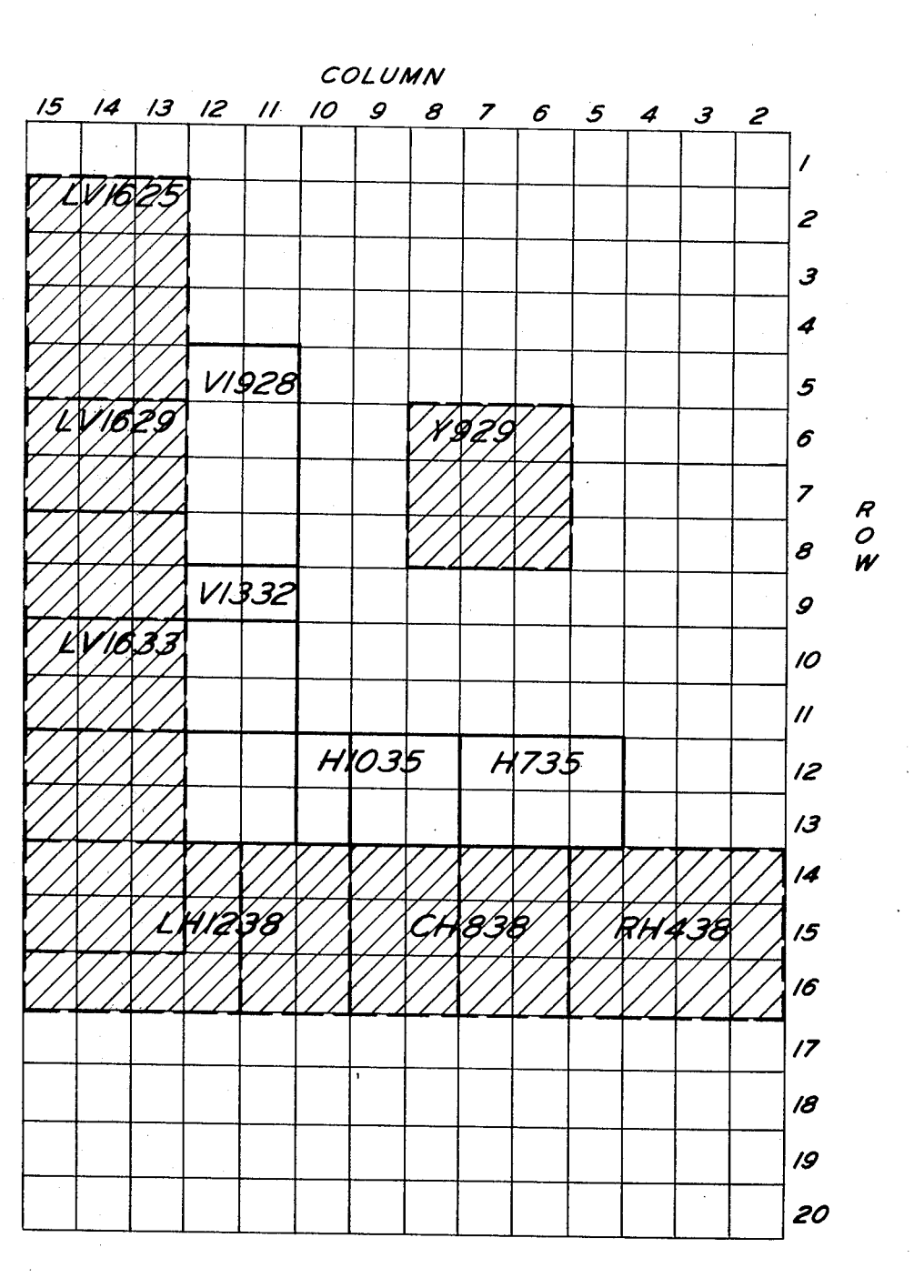

In FIG. 6C the masks for the left-bottom portion of the upper case B are shown within the same portion of the apparent window and comprises masks LV1625, LV1629, LV1633, V1328, V1332, H1035, H735, Y929, LH1238, CH83 and RH438. The masks shown in FIG. 6C represent the feature F306.

Figure 6D:
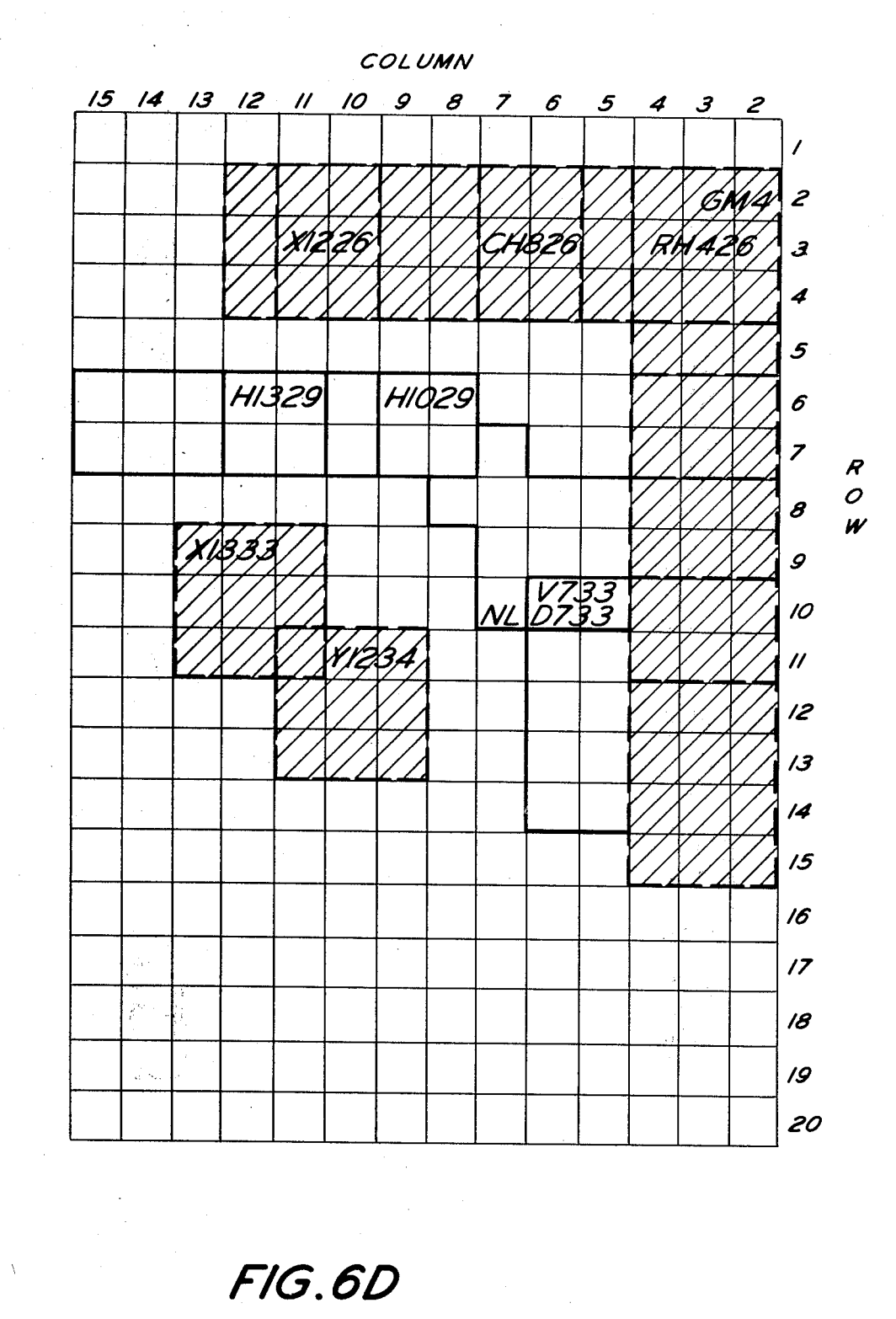

FIG. 6D represents the mask for the right-top portion of the upper case B, which is denoted as feature F702 and is shown within the same portion of the apparent window. As can be seen the masks comprise X1226, CH826, RH426, GM4, H1329, H1029, X1333, Y1234, MDL33 and V733.

Figure 6E:
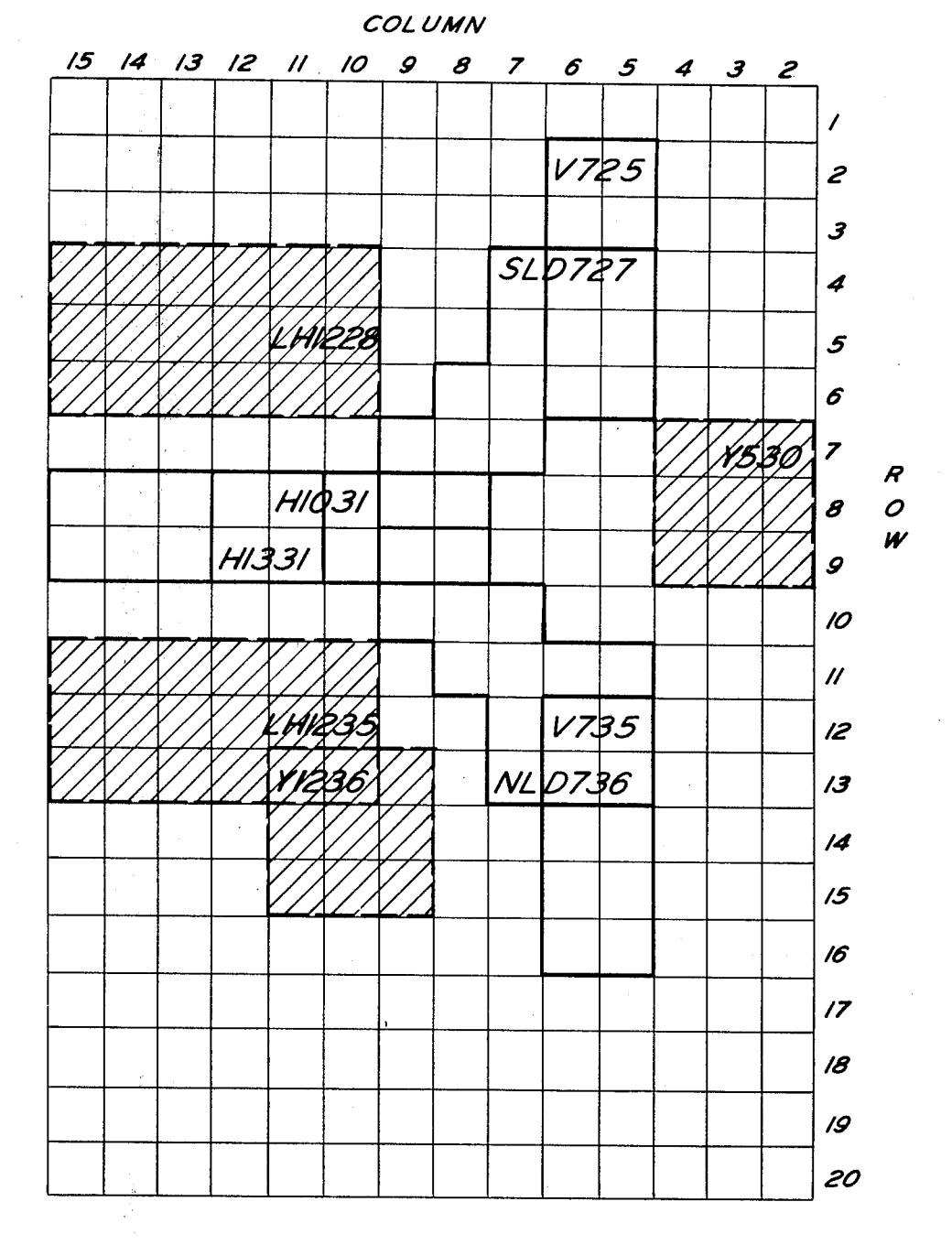

In FIG. 6E there is shown the sub-feature masks for producing the right-middle feature of the upper case B, denoted as feature F609. As can be seen the masks are provided within the same portion of the apparent window and comprise sub-feature masks LH1228, SLD727, V725, H1031, H1331, Y530, LH1235, Y1236, V735 and MDL736.

Figure 6F:
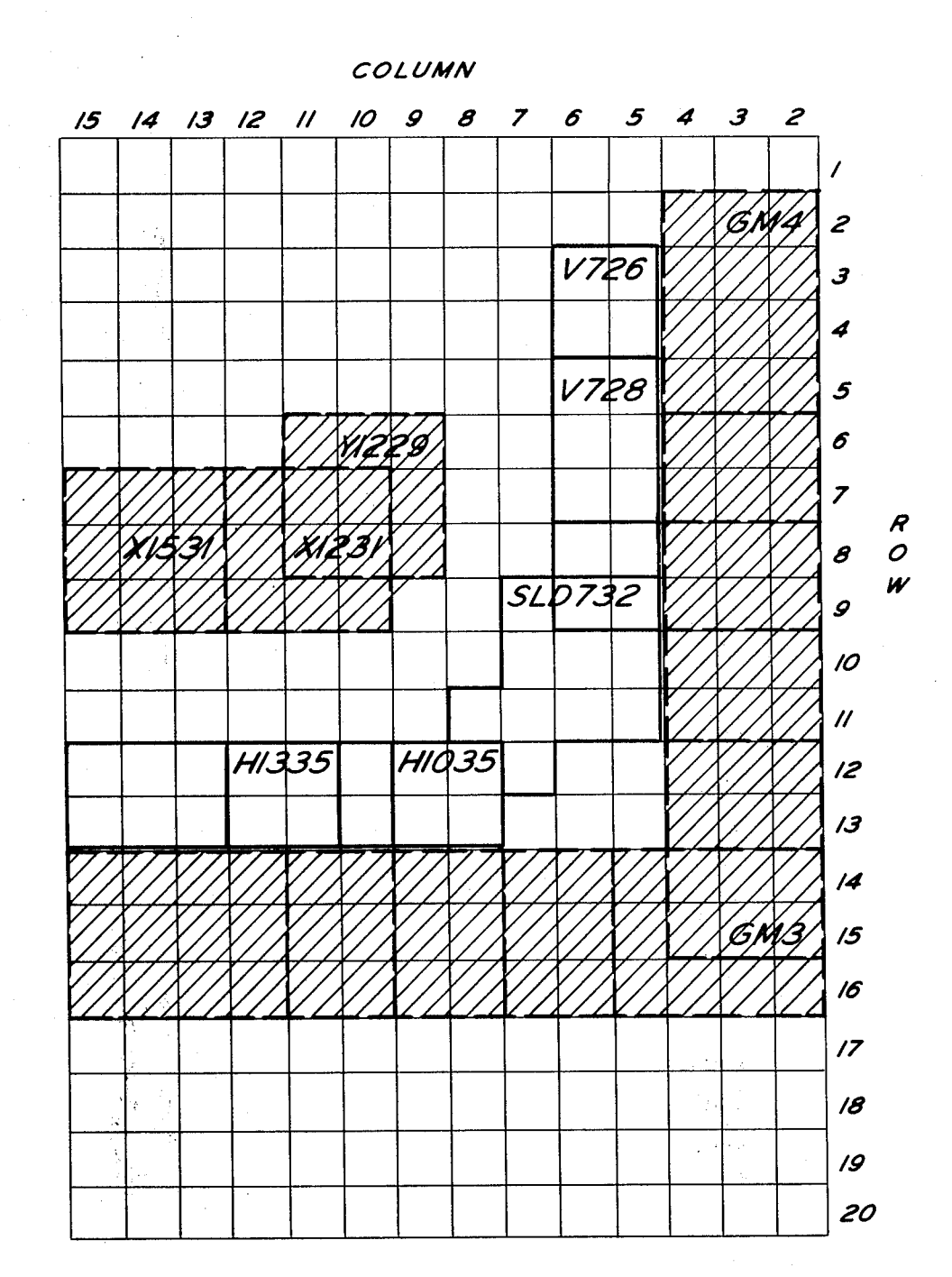

In FIG. 6F there is shown the sub-feature masks comprising the right-bottom features of the upper case B denoted as feature F903. As can be seen this feature is provided within the same portion of the apparent window and comprises masks X1531, X1231, Y1229, V726, V728, SLD732, H1335, H1035, GM4 and GM3. The latter two sub-feature masks are general feature masks.

The sub-feature masks are created as follows. For example, in the positive mask V725 shown in FIG. 6E ten boxes, 140, are encompassed within said sub-feature mask and correspond to the stages of the shift register in columns 5 and 6 rows 2–6 inclusive. For the purpose of clarity, each stage will be identified in accordance with its row and column. For example, the stage which is in row 2 column 5 will be hereinafter referred to as 2, 5. Similarly, any reference to a line connected thereto in the figures is shown with a similar legend. That is, the line connected to stage 2, 5 includes the legend 2, 5 which is encircled.

Mask V725 is an exemplary positive sub-feature mask which is provided to detect a vertical line in a feature and is illustrated schematically in FIG. 7. As can be seen therein mask V725 basically comprises five OR gates 200, 202, 204, 206 and 208. Each of the OR gates is a two input OR gate, with the inputs to gate 200 being lines 2, 5 and 2, 6, with the inputs to gate 202 being lines 3, 5 and 3, 6, with the inputs of gate 204 being provided by lines 4, 5 and 4, 6, with the inputs to gate 206 being provided by lines 5, 5 and 5, 6 and with the inputs to gate 208 being provided by lines 6, 5 and 6, 6. The output of the OR gates is provided on lines 201, 203, 205, 207 and 209, respectively, which lines are connected as inputs to the mask correlator and threshold circuit 210 which forms a portion of the mask correlator 40 shown in FIG. 1. The correlator 210 is arranged to provide a high signal at its output line 212 when high signals are provided by all or one less than all of the OR gates 200–208. Accordingly, it will be appreciated that if the binary quantized signal within the positive video shift register is a "1" (indicative of the presence of video) in either of the columns in at least four of the five rows 2–6, at least four of the OR gates 200–208 provide "1" signals to the mask circuit 210. Circuit 210 in response to said input signals provides a high signal on line 212 indicating the detection of sub-feature V725.

In accordance with one aspect of this invention, it is unnecessary to connect a diode mask to the stages of the video shift register corresponding to columns 5 and 6 rows 12–16 in order to provide positive mask V735. Instead, the mask V725, which is created as described heretofore with reference to FIG. 7, is delayed via the use of the positive mask delay 42 to duplicate mask V725 but in the vertical position of V735. To that end, output line 212 which represents mask V725 is connected to the serial input of twelve bit delay shift register 214 which is shifted in synchronism with the video shift register under the control of shift signals on line 216 from the controller. This register forms a portion of the positive mask circuitry shown by the function block 21 diagram and denoted as the shift register 214 and includes twelve serial outputs.

As will be appreciated by those skilled in the art, the only difference between mask V735 and V725 is that the latter mask is delayed from the former by ten shift pulses of the video shift register. Accordingly, one can simulate mask V735 by taking the output of the tenth serial bit in the delay shift register 214, since the output thereof is the signal on line 212 after ten shift pulses and hence is indicative of mask V725 delayed ten shifts.

As will be appreciated by those skilled in the art, the actual diode masks are created within the eight rows of the actual window, but, via the use of the twelve delay bits in the delay shift register masks can be created in up to twenty rows, that is within the apparent window. It should now be clear that the masks which are shown in any of the FIGS. 6A through 6F, which are within the first eight rows of the apparent window, may be created at the position shown or may be created at positions above the position shown and merely shifted down (delayed) by the mask delay circuitry, to complete the mask within the real window. Similarly all of the masks shown within the portion of the apparent window encompassing rows 9–20 are created within the real window but shifted to the position in the apparent window, via the use of delay shift registers like that described with reference to FIG. 7.

The use of the mask delay circuitry enables a considerable saving in the number of diodes necessary to produce a mask since it becomes unnecessary to duplicate masks for different vertical positions. By eliminating mask duplication a significant savings in space results.

In FIG. 8 there is shown a typical negative mask, like that for providing the negative mask Y929 shown in FIG. 6C.

As can be seen therein negative mask Y929 comprises three OR gates 220, 222 and 224. Each of the OR gates is a three input OR gate. To that end, the three inputs to 220 are provided by line 6, 6, line 7, 6 and line 8, 6, respectively. The inputs to OR gate 22 are provided by line 6, 7, line 7, 7 and line 8, 7, respectively, and inputs to OR gate 224 are provided by line 6, 8, line 7, 8 and line 8, 8, respectively. The output of the OR gates 220, 222 and 224 are provided on lines 221, 223 and 225, respectively, and are connected as inputs to a mask correlator, threshold and inverter circuit 226. Circuit 226 forms a portion of the negative mask correlator and inverter 46.

The negative mask matrix is constructed in a similar manner to the positive mask matrix to detect the presence of video and to fire (provide a high or "1" signal). Since the negative masks are designed to detect the absence of video, the output of the correlator is inverted by an inverter therein. Accordingly, if none or only one OR gate 220–224 detects video, the correlator 226 will not fire and thus provides a "0" output signal. The "0" output signal is inverted by the inverter to provide a "1" signal on output line 228. A high signal on output line 228 indicates that sufficient video is absent to satisfy the negative sub-feature. If too much video is present (that is, video is present at inputs to two or more OR gates 220–224) the mask correlator 226 fires to provide a high signal which is inverted therein to provide a low signal indicating that the mask is not satisfied.

As will thus be appreciated the output of the mask correlator threshold and inverter is of the proper polarity for combination with the positive mask correlator in the general feature gates and the feature matrix to provide the features shown in FIGS. 6A through 6F.

Like the positive mask matrix, the negative mask matrix includes a delay shift register 230. Shift register 230 is a twelve bit serially fed shift register whose input is provided via line 228. Shift pulses for the register are provided via line 232 from the controller in synchronism with the shift pulse to the video shift registers. Accordingly, negative sub-feature mask Y929 can be reproduced at lower vertical positions within the apparent window by merely taking the appropriate output terminal of the delay shift register 230.

As noted heretofore the feature matrix is provided with strobe signals from the horizontal analyzer 94 and the vertical analyzer 98 to enable the detection of features during the interval of time that the desired portion of the character is passing through the window.

The horizontal analyzer is illustrated in FIG. 10. The horizontal analyzer includes a horizontal counter 320, an AND gate 322, a gap flip-flop 324 and logic drivers 326, 328, 330, 332 and 334. The horizontal counter 320 includes a first input line 336 which is connected to the horizontal counter to reset the count in the counter to zero. The reset line 336 is connected to the output of the central processor 104 to provide a reset signal on line 336 to start the detection of a new character. The output of the AND gate 322 is connected via input line 338 to the horizontal counter 320. The inputs of the AND gate 322 are connected to a horizontal clock in the control circuitry of this system via input line 340 and to an output of the gap flip-flop 324 via line 342. The flip-flop 324 also includes an output line 347 which is connected to the central processor 104. The gap flip-flop 324 has its input line 344 connected to the output of the gap feature logic 346. The horizontal counter 320 also includes a plurality of output lines which are connected to logic drivers 326 through 334. The first output line 348 of counter 320 is connected to logic driver 326. Output line 348 is energized when the count in the horizontal counter is equal to "one". It should be noted that above the line 348 in FIG. 10 is the legend "HC=1". The legend indicates a count at which the associated output line is equal to "one". The HC appearing above the other output lines of the horizontal counter 320 also represents the horizontal count for that line.

Thus, the output logic driver 326 is driven by a signal on line 348 when the count in the horizontal counter is "one". The output driver 326 is connected via output line 350 to the central processor 104. The signal on line 350 to the central processor acts as a recognition flag which signifies to the central processor that it must look to the character recognition logic to determine the character that has been recognized. That is, after the previous character has been recognized, the central processor must examine the output of the character encode matrix, as provided by the font select circuitry, to determine the character that has been recognized.

The next output line, 352, of the horizontal counter 320 is connected to the logic driver 328. The output line 352 is energized by the horizontal counter when the horizontal count is smaller than 14. Thus, during the first 13 counts of the horizontal counter, the line 352 is energized which thereby causes a driving of the output logic driver 328. Logic driver 328 is connected via line 354 as an input to the feature matrix 64 to provide a left strobe signal which enables the detection of sub-features during the first 13 counts of the horizontal counter 320.

The next output line 356 of the horizontal counter 320 is connected to logic driver 330 which in turn is connected to output line 358. Line 358 provides a center strobe signal to the feature matrix which enables the detection of features between the fourth and 16 counts of the horizontal counter.

Output line 360 of the horizontal counter 320 is connected to logic driver 332 which in turn is connected to line 362. The line 362 is connected to the feature matrix and provides a strobe right signal to enable the detection of features when the horizontal count is larger than seven.

Output line 364 of the horizontal counter 320 is connected to logic driver 334. The driver 334 is connected to output line 366. Line 366 serves as an input to the central processor 104 when the horizontal count is equal to 32. The signal appearing on line 366 is a rescan signal. The rescan signal is used as follows: When no character is recognized and the count in the horizontal counter reaches 32 and a gap is not detected signifying the end of a character (the gap being detected by the gap feature logic as will be described hereinafter), the rescan signal provided on line 366 causes the central processor to automatically direct the scanner 22 to rescan the character. If after a predetermined number of scans, the character is not recognized, the central processor generates a confusion character which indicates to the operator that an unreadable character or a character which cannot be read is provided on the document.

Another rescan signal is provided by the central processor whenever a gap is detected and no character is recognized.

The input line 340 to the AND gate 322 is connected to the output of the horizontal clock. The horizontal clock provides a signal on line 340 after each 40 shift pulses have been provided to the video shift registers 32 and 34. These pulses are transmitted by the AND gate 322 to the horizontal counter 320 as long as line 342 receives a positive signal from the gap flip-flop 324. The gap flip-flop 324 provides such a positive signal on line 342 as long as no gap has been detected by the gap feature logic 346.

The gap feature logic 346 includes logic for the determination of an actual gap between two characters and circuitry which is responsive to the determination that a character has been completed by the detection of certain right side features of the characters. Thus, upon the determination of either an actual gap or the right side features of a character, the gap feature logic provides a signal on line 344 which sets the gap flip-flop 324, thereby providing a positive signal, via line 347, to the central processor 104. This indicates the trailing edge and causes the examination of the character encode matrix via the font select circuitry. In addition the setting of flip-flop 324 causes a ground signal to appear on its output line 342 which disables AND gate 322, thereby preventing horizontal clock signals from appearing on line 338 as an input to the horizontal counter. When the next character is scanned the central processor 104 provides a "clear" or "reset" signal on line 336 to restart the counter a its zero position.

As will be appreciated from the foregoing the gap feature logic 346 and the gap flip-flop 324 make up the gap logic 92 shown in FIG. 1.

The gap feature logic 346 includes a plurality of gap masks for the detection of an actual gap. The gap masks are provided by the mask correlators 40 and 46 and are constructed in a manner similar to other sub-feature masks.

The vertical analyzer 98 is shown in FIG. 11.

As can be seen the vertical analyzer basically comprises a vertical counter 370 which is connected to six logic drivers 372, 374, 376, 378, 380 and 382, via output lines 384, 386, 388, 390, 392 and 394, respectively. The vertical counter 370 also includes an input line 396 which receives shift pulses as the video shift register is shifted under the direction of the controller. A second input line 398 is provided for the counter and is connected to the horizontal clock to provide a reset pulse after each 40 pulses from line 396. Therefore, the vertical counter 370 is stepped through 40 counts before it is recycled by the reset pulse on line 398.

Line 384 is energized when the vertical count in the counter 370 is larger than or equal to 12 but smaller than or equal to 20. The legend "VC" provided above lines 384 through 394 refers to the vertical count. Line 386 is energized when the vertical count is greater than or equal to 16 but less than or equal to 24. The line 388 is energized when the vertical count is greater than or equal to 20 but less than or equal to 28. The line 390 is energized when the vertical count is greater than or equal to 24 but less than or equal to 32. The line 392 is energized when the vertical count is greater than or equal to 28 and less than or equal to 36. The line 394 is energized when the vertical count is greater than or equal to two and less than or equal to 32.

The output of logic driver 372 is connected, via line 400, as an input to the feature matrix. The signal appearing on line 400 serves as the sub-bottom strobe. The output of driver 374 is provided, via line 402, as an input to the feature matrix to serve as the bottom strobe. The output of driver 376 is provided, via line 404, as an input to the feature matrix to serve as the sub-middle strobe. The output of driver 378 is provided, via line 406, as an input of the feature matrix to serve as the middle strobe. The output of driver 380 is provided, via line 408, as an input to the feature matrix to serve as the sub-top strobe. The output of driver 382 is provided, via line 410, to the input of the feature matrix to serve as the top strobe.

It should be noted at this point that the class of vertical strobe signals provided to the feature matrix 64 from the vertical analyzer is not limited to the sub-bottom strobe of line 400, the bottom strobe of line 402, the sub-middle strobe of line 404, the middle strobe of line 406, the sub-top strobe of line 408 and the top strobe of line 410, but may include a combination of such strobes. For example in some cases two or more of the strobe signals provided on lines 400 through 410 may be provided into an OR gate to widen the resulting strobe, e.g. the sub-bottom strobe on line 400 being provided as one input to an OR gate, with the other input thereto being provided with the bottom strobe of line 402 to provide a bottom-sub-bottom strobe existing when the vertical count is less than or equal to 24 but greater than or equal to 12.

It can therefore be seen that the horizontal and vertical analyzer effectuates the feature matrix 64 only during the period or interval in which specific feature detection circuitry examine the character. This strobing within predetermined periods, in effect, assigns or provides the features detected with an address within the character itself. It is this address which is utilized in the feature code.

It should be appreciated that the periods of the strobe enabling signals are long enough to provide sufficient latitude in the detection of various features so that specific shapes of features can be accurately defined during the detection. That is, since the relative location of a feature's sub-feature within the character is not held within rigid requirements, the shape of the sub-feature masks can be more specifically defined since the sub-feature has room to be moved into correlation within the mask.

The strobing for the features shown in FIGS. 6A through 6F is as follows: In FIG. 6A the generation of feature F100 shown therein represents the left-top of the upper case B. Accordingly, this feature is enabled for detection during the interval that the horizontal analyzer 94 is providing a left strobe signal on line 354 and the vertical analyzer 98 is providing a top strobe signal on line 410. The detection of feature F200 which represents the left-middle of the upper case B is accomplished during the interval in which the horizontal analyzer is providing a left strobe signal on line 354 and the vertical analyzer is providing either a sub-top strobe signal on line 408 or a middle strobe signal on line 406. The feature F306 shown in FIG. 6C represents the left-bottom of the upper case B and is detected during the interval that the horizontal analyzer 94 is providing a left strobe signal on line 354 and the vertical analyzer 98 is providing a sub-middle strobe on line 404 or a bottom strobe on line 402. The feature F702 shown in FIG. 6D represents the right-top portion of the upper case B and is detected during the interval in which the horizontal analyzer is providing a right strobe signal on line 362 and the vertical analyzer is providing a top strobe signal on line 410. The feature F609 shown in FIG. 6E represents the right-middle of the upper case B and is detected during the interval in which the horizontal analyzer is providing a right strobe signal on line 362 and the vertical analyzer is providing a middle strobe signal on line 406. The feature shown in FIG. 6F is denoted as feature F903 and represents the bottom-right of the upper case B. This feature is detected during the interval that the horizontal analyzer is providing a right strobe signal on line 362 and the vertical analyzer 98 is providing a sub-middle strobe on line 404 or a bottom strobe on line 402.

As noted heretofore the circuitry of the vertical data column 96 provides a height count to provide the system with means for determining whether an upper case or a lower case character is being scanned. The vertical data column is shown in the schematic diagram of FIG. 12. As can be seen the vertical data column basically comprises a shift register 420 and an OR gate 422. The shift register 420 is a 40-bit shift register having an input line 424 which receives shift pulses in sychronism with the shifting of the video shift registers. The output of line 426 of the OR gate 422 is provided as a second input to the shift register 420 and provides the binary bits which are inserted into the shift register. The shift register includes an output line 428.

Line 428 is connected to a vertical height counter circuit 430 and is also connected, via line 432, to one input of the OR gate 422. The other input of the OR gate 422 is provided via line 434 and is coupled to intercept line 106 from the positive mask delay circuit 42 and the negative mask delay circuit 48. The intercept signal provided on line 106 represents the satisfaction of an intercept mask established by the mask delay circuits.

The vertical data column 96 provides a profile of the height of the character. That is, as the video shift registers 32 and 34 are shited, ultimately each signal of the binary quantized signal which passes therethrough ultimately passes through the stages of the shift register making up the intercept mask. Since the vertical data column shift register 420 is 40 bits long, and since each column of the video shift register is shifted along, the shift register 420 is horizontally synchronized or aligned with the shifting bits of data therethrough. In operation, the vertical column register 420 is cleared by a signal provided on input line 436 to the register. Line 436 is connected to the output of the leading edge detector 100 which clears the register 420 prior to the determination of the character profile. As the new character progresses through the intercept mask the intercept signal provided on line 434 is provided to the OR gate 422. As the first column of binary bits is passed through the intercept mask the vertical data column shift register 420 receives the same bits via line 426 and this stores within the forty bits of the vertical data column shift register, the same information that is in the video shift registers at that time. That is, since the video shift register was cleared by the signal on line 436 each of the bits in the shift register 420 were "0", thereby providing "0's" via line 428 and line 432 to the OR gate 422. Therefore, unless an intercept signal was provided via line 434, a 0 is placed in bit one of the shift register 420. Accordingly, the bit provided to line 426 is like the signal or bit on line 434. If the 0 bit is provided to line 432, the OR gate is not enabled, thereby providing a 0 bit to line 426. If a 1 bit is provided via line 434, the OR gate 422 is enabled, thereby providing a 1 bit to line 426. It should thus be appreciated that if there is a least one 1 bit in any row of the video shift registers at a time when there is an intercept signal a 1 will appear in the bit of the vertical data column shift register 420 corresponding to the row. After the complete character profile has been stored in the shift register 420, the vertical height counter 430 receives the output bits via line 428 from the shift register 420. The vertical height counter includes a binary counter which is stepped each time a 1 is received from the vertical data column shift register 420. The output of the vertical height counter 430 is provided via line 438 to logic circuitry 440 to determine whether an upper or a lower case character has been detected where the characters are otherwise identical. That is, since an upper case character is vertically longer than a lower case character the logic of circuit 420 is capable of determining by the vertical count whether an upper or lower case character has been detected.

As can be seen in FIG. 12 the vertical data column shift register also includes other output lines 442 which are connected to line follow logic 444. The line follow logic is provided in order to prevent the scanning raster of the document scanner from leaving a line of type. Theoretically, a line of type on a document is perfectly horizontally aligned. In practice however, a line of type on a document often varies from the exact horizontal disposition on the document. Thus, as the scanner proceeds along a horizontal line on the document, where the line is not perfectly horizontally aligned, the scanner ultimately starts scanning either higher or lower on the characters as the scanner progresses along the line.

As hereinbefore mentioned, it is preferable to maintain or normalize the character size at approximately 25 samples. It is also preferred that the character be five samples from the top of the scan and ten samples from the bottom of the scan. It is a necessity that the entire character be provided within the scan, whether it be an average character or not. Therefore, if a 1 bit is detected in either the first bit or the fortieth bit of the forty bit vertical data column shift register 420, there is a probability that the character is out of the top or bottom of the scan. The line follow logic circuitry therefore includes three output lines 446, 448 and 450 which are connected to a register 452. Register 452 stores the information provided on lines 446, 448 and 450. The line follow logic 444 provides a signal on line 446 when the 1 bits in the shift register 420 are too close to the top of the shift register. That is, if more than ten bits at the left end (e.g. bits 31 through 40) of the shift register 420 are 0 it indicates that the scan is too low and the character too high within the scan. Therefore, line 448 is provided with a signal to indicate that the scan is low. Correspondingly, if the number of 0 bits in the leftmost bits of the shift register 420 are less than ten, it indicates that the scan is too high. Therefore a signal on line 446 is provided to the register 452 to indicate this condition. Also, if either bit 1 or bit 40 is in the 1 state, line 450 is provided a signal from the line follow logic 444 which indicates that the character is out of the top or bottom of the scan.

The register 452 is connected via lines 454, 456 and 458 to the central processor 104. The central processor, upon receipt of the information from lines 454, 456 and 458, provides signals to the document scanner to either raise or lower the scan for the next character. Thus, as the scanner proceeds along the line, the central processor continuously checks the output of the line follow logic 444 to determine whether the scan should be raised or lowered in order to properly scan the characters. The central processor retains the location of the first character in the line so that the scanner is returned to the proper position when the first character in the next line is scanned.

In FIG. 13 there is shown the operation of the character recognition portion of the system 20 for recognizing the left-top features of a character, and in particular the left-top features of the upper case B. As can be seen therein the masks for establishing the left-top feature F100, shown in FIG. 6A, comprises a negative general mask, denoted by GM1, a second general feature mask, denoted by GF3, a positive diode mask H429, and four negative diode masks LV1629, LV1625, Y733 and Y933. As can be seen in FIG. 13 the general mask GM1 comprises three diode masks RH426, CH826, and LH1226, whose outputs are provided via lines 500, 502, 504, respectively to the inputs of an AND gate 506. The output of AND gate 506 serves as the output of the mask GM1 and serves as one input to an AND gate 510 in the general feature mask GF3. As can be seen GF3 comprises positive diode sub-feature masks H729, H1029, V1329 and V1333 and negative diode sub-feature mask LV1633. The output of maks H729 is provided via line 512 to another input to AND gate 510. The output of mask H1029 is provided, via line 514, to another input to AND gate 510. The output of mask V1329 is provided via line 516 to another input to AND gate 510. The output of mask V1333 is provided via line 518 to another input to AND gate 510 and the output of mask LV1633 is provided via line 520 to the last input to AND gate 510. The output of AND gate 510 serves as the output of the general feature mask GF3 and is provided on line 522 as one input to the feature matrix 64. The sub-feature masks H429, LV1629, LV1625, Y733 and Y933 are connected via lines 524, 526, 528, 530 and 532, respectively, to the respective inputs of the feature matrix 64.

The use of the general feature gates for high usage masks minimizes the number of components necessary to create the diode masks for the system since a mask need only be created once and it output fed to as many different inputs of the mask matrix as are necessary to create the features requiring the high usage masks. For example the general mask GM4 for the feature F702 shown in FIG. 6D need not be duplicated to produce the same mask in feature F906 shown in FIG. 6F. Rather, the output of the mask used to create GF4 the first time is merely fed as a second input to the feature matrix, i.e., the input associated with feature F906.

As can be seen the feature matrix 64 includes plural diodes 534. The anodes of the diodes 534 are connected to each other while the cathodes of the diodes are connected to respective inputs of the feature matrix 64. With such an arrangement the diodes form an AND gate. It should be appreciated at this point that the diodes 534 shown in feature matrix 64 only represent the production of the feature F100 shown in FIG. 6A. Other features of the character B as well as all other features for the other characters which the system 20 is arranged to recognize are also created by diodes within the feature matrix 64. To that end various other inputs to the feature matrix are shown and are provided with the legend "From Masks, Gates and Strobes".

As noted heretofore since feature F100 represents the left-top portion of the character, the detection of this portion of the character is made to occur during the interval of time that the left-top portion of the character is passing through the apparent window. To that end as noted heretofore the horizontal analyzer 94 and the vertical analyzer 98 provide strobe signals to the feature matrix. As can be seen the horizontal strobe is provided on input line 536. Line 536 is connected to the horizontal analyzer 94 and is provided with either strobe left signals, via line 354, or strobe center signals, via line 358. The vertical strobe signals from the vertical analyzer are provided as one input to the feature matrix 64, via line 538, which is connected to the cathode of a diode 534 in the matrix. Line 538 is connected to line 410 in the vertical analyzer to receive a top strobe signal. As can be seen an additional input 540 is provided to the feature matrix 64. This input line is connected to the cathode of another diode 534 within the matrix and is arranged to receive a strobe signal from the controller whenever the system is scanning a character for recognition thereof. As noted immediately above, the diodes 534 are connected as an AND gate. The output of the AND gate is provided on line 542. This line serves as the single node output of the feature matrix associated with the recognition of feature F100.

Operation of the feature matrix 64 is as follows: If any of the sub-feature masks are not satisfied (thereby indicating that the scanner has not detected the desired video) the input to the feature matrix 64 associated with that mask is at ground potential, whereupon the diode 534 of the feature matrix whose cathode is connected thereto becomes conductive and pulls the output line 542 of the matrix to ground potential. When line 542 is at ground potential feature F100 is not recognized. If all of the associated sub-feature masks are satisfied (indicating that the desired video is present) a positive voltage appears on lines 522, 524, 526, 528, 530 and 532. If this event occurs during the interval of time that the horizontal strobe is providing either a left or center strobe signal and the vertical strobe is providing a top strobe signal and the controller is providing a feature strobe signal, high signals are provided on lines 536, 538 and 540, respectively, of the feature matrix. Accordingly all of the inputs to the diodes forming the AND gate associated with feature F100 are at a positive potential and preclude the diodes from conducting, whereupon the signal appearing on line 542 is a positive or high signal, thereby indicating the recognition of feature F100.

The feature matrix provides various other single node outputs, denoted by the reference numeral 544, each of which represents the detection of other features whether in the same geographic area (left-top) or other geographic areas.

In FIG. 14 there is shown a schematic diagram of a portion of the feature matrix for producing features F100, F101, F102, F103, F104, F204, F205 and F207 from the diode masks and strobes. Each of these features is provided, via an output line, identified by the feature number. The output line for feature F100 is denoted by the reference numeral 542 and represents that output shown in FIG. 13. The features F101, F102, F103, F104, F204, F205 and F207 represent other features and have been shown diagrammatically, via the use of lines 544 in FIG. 13. It is to be understood that lines 544 represent all other feature input lines to the feature encode matrix 66.

As can be seen in FIG. 14 the feature encode matrix include the various input lines 540, 536, 538, 522, 524, 528, 526, 530 and 532, which have been described heretofore with reference to FIG. 13. In addition other lines, namely, GF1, GF7 and Y734 are provided from associated matrices and delay circuits. These latter three lines are just a few of the multitude of mask and strobe inputs in the feature matrix.

The anodes of diodes 534 forming the matrix 64 are connected together on line F100 and their cathodes are connected to input lines 540, 536, 538, 536, 522, 524, 528, 526, 530 and 532, respectively, and thus form the AND gate described heretofore with reference to FIG. 13. The remaining diodes shown in the portion of the matrix shown in FIG. 14 are provided to produce other features. To that end the anodes of four diodes 534 are connected to line F101 and their cathodes are connected to lines 540, 538, 536 and 522, respectively. The anodes of six diodes 534 are connected to line F102 and their cathodes are connected to lines 540, 536, 538, GF1, 524 and Y734, respectively. The anodes of six diodes are connected to line F103 and their cathodes are connected to lines 540, 536, 538, GF7, 528 and 526, respectively. The anodes of four diodes are connected to line F104 and their cathodes are connected to lines 540, 536, 538 and 524, respectively. The anodes of three diodes are connected to line F204 and their cathodes are connected to lines 540, 536 and GF1, respectively. The anodes of five diodes are connected to line F205 and their cathodes are connected to lines 540, 536, GF1, 524 and Y734, respectively. The anodes of four diodes are connected to line F207 and their cathodes are connected to lines 540, 536, GF1 and 524, respectively.

As will be appreciated to those skilled in the art each of the features is formed by an AND gate composed of the diodes in the feature matrix whose anodes are connected to the line representative of that feature in the same manner as described heretofore with reference to feature F100.

The single node output lines of the feature matrix, indicating the detection of the associated feature, are provided to the feature encode matrix 66. The feature encode matrix encodes each of the single node inputs from the feature matrix into a 8-bit binary code associated with the geographic area in which said feature is located. To that end the feature encode matrix 66 is formed of plural diodes which are arranged in nine groups. Each group of diodes represents one of the predetermined areas on each character. For example, the feature encode matrix includes diodes forming a matrix for encoding left-top features, diodes for encoding left-center features, diodes for encoding left-bottom features, diodes for encoding center-top features, diodes for encoding center-middle features, diodes for encoding center-bottom features, diodes for encoding right-top features, diodes for encoding right-middle features and diodes for encoding right-bottom features. In the feature encode matrix 66 shown in FIG. 13 the portions of the feature encode matrix for encoding left-top features, left-middle features and right-bottom features are shown within dotted areas denoted by the reference numerals 546, 548 and 562, respectively.

The output of the feature encode matrix is provided on 72 output lines, to be described later, with lines 1–8 (reading from left) forming the first 8-bit code, lines 9–16 forming the second 8-bit code, lines 17–24 forming the third 8-bit code, lines 25–32 forming the fourth 8-bit code, lines 33–40 forming the fifth 8-bit code, lines 41–48 forming the sixth 8-bit code, lines 49–56 forming the seventh 8-bit code, lines 57–64 forming the eighth 8-bit code and lines 65–72 forming the ninth 8-bit code. The first, second, third, fourth, fifth, sixth, seventh, eighth and ninth codes represent the geographic areas of left-top, left-middle, left-bottom, center-top, center-middle, center-bottom, right-top, right-middle and right-bottom, respectively.

Referring now to FIG. 15 there is shown a portion of the details of the feature encode matrix 66. As can be seen therein matrix 66 includes plural diodes 564 which are connected within the matrix in groups, each group defining a geographic area. Portions of the groups 546, 548 and 562, representing the left-top, left-middle and right-bottom geographic areas are shown in FIG. 15.

The inputs to the feature encode matrix are provided from the feature matrix, with each input line being associated with the recognition of a respective feature. As can be seen in FIG. 15 the input to the portion of the feature encode matrix 66 associated with the left-top geographic area comprise lines 542, 566, 568, 570 and 572. These lines are associated with the features F100, F101, F102, F103 and F157, respectively. The inputs to the portion of the matrix associated with the left-middle features are provided via lines 574, 576, 578 and 580. These lines represent features F200, F201, F202 and F211, respectively. As can be seen each input line includes an inverter driver 582 connected thereto. The output of the drivers 582 connected to input lines 542, 566, 568, 570, 572, 574, 576, 578 and 580 are denoted by the reference numerals 584, 586, 588, 590, 592, 594, 596, 598 and 600, respectively.

The feature encode matrix 66 includes eight lines, 602, 604, 606, 608, 610, 612, 614 and 616, connected to a source of positive potential $V_{cc}$ and which, as will be seen, are coupled to the output lines of the matrix.

In order to encode the single line input 586 associated with feature F100 into the 8-bit binary code therefore the cathodes of two diodes 564 are connected to line 584 and their anodes are connected to lines 604 and 612, respectively. Feature F101 is encoded by connecting the cathodes of four diodes 564 to input line 586 while their anodes are connected to lines 602, 604, 608 and 612, respectively. Feature F102 is encoded by connecting the cathodes of two diodes 564 to input line 588 while their anodes are connected to lines 610 and 612, respectively. Feature F103 is encoded by connecting the cathodes of two diodes 564 to input line 590 while their anodes are connected to lines 606 and 610, respectively. Feature F157 is encoded by connecting the cathodes of three diodes 564 to input line 592 while their anodes are connected to lines 606, 614 and 616, respectively. As will be appreciated the features within the 100 series, that is features F100–F157, are associated with the left-top geographic area. The features in the 200 series, namely features F200, F201, F202 and F211 are associated with the left-middle geographic area.

In order to encode feature F200 the cathodes of two diodes 564 are connected to input line 594 while their anodes are connected to lines 602 and 604, respectively. In order to encode feature F201 the cathodes of two diodes 564 are connected to input line 596 while their anodes are connected to lines 602 and 610, respectively. In order to encode feature F202 the cathodes of three diodes 564 are connected to input line 598 while their anodes are connected to lines 602, 610 and 616, respectively. In order to encode feature F212 the cathodes of three diodes 564 are connected to input line 600 while their anodes are connected to lines 604, 612 and 616, respectively.

As can be seen within the portion 546 of the feature encode matrix 66 a plurality of jumpers 618 are connected between lines 602, 604, 606, 608, 610, 612, 614, 616 and lines 620, 622, 624, 628, 630, 632 and 634, respectively. A driver inverter 636 is connected in each of the lines 620-634 to provide inverted output signals on lines 638, 640, 642, 644, 646, 648 650 and 652, respectively. Similar jumpers 618 are provided to connect lines 602-616 to lines 654-670. Further driver inverters 636 are connected in lines 654, 656, 658, 660, 662, 664, 668 and 670 to invert the signals appearing on those lines and to provide those on output lines 672, 674, 676, 678, 680, 682, 684, and 686, respectively.

Further jumpers 618 are connected between lines 602, 604, 608, 610, 612, 614, 616, and lines 688, 690, 692, 694, 696, 698, 700 and 702, respectively. Further driver inverters 636 are connected in lines 688-702. The inverters 636 invert the signals provided on lines 688, 690, 692, 694, 696, 698, 700 and 702 and provide the inverted signals on output lines 704, 706, 708, 710, 712, 714, 716, and 718, respectively.

It should be appreciated that output lines 638–652 represent the first 8-bit binary code, that is the binary code associated with the left-top feature. The output lines 672–686 represent the second binary code, that is the binary code associated with the left-middle feature. The output lines 704–718 represent the ninth 8-bit code, that is the binary code associated with the right-bottom feature.

Operation of the feature encode matrix will be described with reference to the encoding of feature F100 (as provided along line 542) into the 8-bit binary code which is provided on output lines 638–652 of the left-top portion 546 of the feature encode matrix. As noted heretofore the detection of feature F100 causes a positive signal, i.e., a 1, to appear on line 542. The 1 is inverted by inverter 582 and is provided as 0 on line 584. This ground signal appearing on line 584 causes the two diodes, whose cathodes are connected thereto to be rendered conductive, thereby pulling lines 604 and 612 to ground. The ground signal appearing on line 604 and 612 is coupled, via jumpers 618, to lines 622 and 630. The low or 0 signals appearing on lines 622 and 630 are inverted by inverters 636 and provided as high or 1 signals on output lines 640 and 648. All of the other diodes 564 associated in the matrix portion 546 remain non-conductive due to the low or 0 signals appearing at their input lines 566 and 572. Accordingly, the inverted outputs appearing on lines 638, 642, 644, 646, 650 and 652 will be at ground potential or 0. Therefore, the detection of feature F100 by the feature matrix results in the production of the 8-bit binary code of 01000100.

The 72 output lines from the feature encode matrix are provided as inputs to the feature code register 68. The seventy-two input lines to the register represent the nine, 8-bit binary codes describing the character being scanned. In the interest of clarity each of the 73 output lines from the feature encode matrix is provided with a legend indicating the geographic area associated therewith and the pit placement within the code for each area. For example line 638 is provided with the legend LTB1, which indicates the left-top geographic area bit 1. Similarly LTB2 represents left-top bit 2 and is provided along line 640. Similarly the legend LMB3 is provided on line 676 and represents the left-middle bit 3 while the legend appearing on line 714 appears as RBB6 thereby representing right-bottom bit 6.

The binary code signals appearing on the output lines of the feature encode matrix are inverted (by means not shown) and provided as respective inputs to the feature code register. The feature code register is a parallel input register including 72 stages. Output lines are provided for each stage and a high or 1 signal appears at the output whenever a ground active or 0 signal is provided at its associated parallel input. The register is arranged such that stages –8 of the register store the respective bits of the first, 8-bit code, that is the information provided on lines 638–652, respectively. Similarly stages 9–16 of the register store the respective bits of the second 8-bit code, that is the signals appearing on lines 672–686, respectively. Stages 17–24 store the respective bits of the third 8-bit code, stages 25–32 store the respective bits of the fourth 8-bit code, stages 33–40 store the respective bits of the fifth 8-bit binary code, stages 41–48 store the respective bits of the sixth 8-bit code, stages 49–56 store the respective bits of the seventh 8-bit code, stages 57–64 store the respective bits of the eighth 8-bit code and stages 65–72 store the respective bits of the ninth 8-bit code, the is the signals appearing on lines 704–718, respectively. The stages of the feature code register are interconnected so that the register can be fed or accessed serially for diagnostic purposes, that is to load the register with a particular code to test the circuitry of the system. The feature code register can also be accessed for feature code analysis to include character recognition by the central processor. In addition the register includes a "clear" input line denoted by the reference numeral 720 in FIG. 13. The trailing edge detector 100 provides the "clear" signal along line 116 to input line 720 of the feature code register to clear the register upon recognition of a character.

The function of the feature code register is to store the 8-bit binary code descriptive of a feature and to provide the stored code on its output lines until a character is recognized by the remaining portion of the system. Since each feature is detected at a different time, that is the time in which that portion of the character is within the apparent window, it is necessary to store the feature codes until the last code is generated, whereupon the feature decode matrix decodes such features to provide an output signal indicative of the recognized character.

In the example give heretofore, that is the production of the 8-bit binary code representing the feature F100, the signals appearing on lines 638, 640, 642, 644, 644, 648, 650 and 652 are 0, 1, 0, 0, 0, 1, 0 and 0, respectively. These signals are inverted (by means not shown) and are applied as the inputs to the feature code register portion associated with the left-top geographic area. Accordingly ground active signals are only applied to bit 2 and bit 6 of the first eight stages of the feature code register. The ground active signals appearing on bits 2 and 6 cause those register stages to set to provide 1 signals on their output lines for bits 2 and 6, respectively, while 0 or low signals are provided on the output lines for bits 1, 3, 4, 5, 7 and 8, respectively.

During the interval in time wherein the left-middle portion of the character is passing through the apparent window, the ninth through sixteenth stages of the feature code register are set in accordance with the feature detected by matrix portion 548 and are provided by the output lines of feature code register for such stages. The remaining portion of the feature code registers also provide output signals from their associated stages corresponding to the code provided thereto by the remaining portions of the feature encode matrix during the intervals of time when the associated portion of the character is passing through the window.

The outputs of the feature code register are provided with legends indicating the feature code register stages to which said output lines are connected. For example, the feature code register stage associated with bit 1 of the left-top geographic area is denoted B1LT. In a similar manner the second bit of the portion of the feature code register associated with the left-middle is denoted as B2LM and the sixth bit of the portion of the feature code register associated with the right-bottom is denoted as B6RB.

The feature decode/character encode matrix can be thought of as including two portions, a feature decode portion which decodes the information provided by the 72 output lines of the feature code register 68 to provide a single node signal indicating the recognition of a particular character, and the character encode matrix portion which encodes the single node signal indicative of a recognized character into a binary code which the central processor 104 can recognize.

The details of the feature decode portion of the feature decode/character encode matrix 70 are shown in the schematic diagram of FIG. 16A.

As will be appreciated FIG. 16A only represents the portion of the diode matrix for decoding the left-top features from the 8-bit code provided by the associated portion of the feature code register. Similar diode matrices are provided to decode the left-middle 8-bit code, the left-bottom 8-bit code, the center-top 8-bit code, the center-middle 8-bit code, the center-bottom 8-bit code, the right-top 8-bit code, the right-middle 8-bit code and right-bottom 8-bit code. In FIG. 13 the portion of the matrix for decoding the left-top features is shown diagrammatically by the broken line box 722. Similarly the portion of the matrix for decoding the left-middle features is diagrammatically shown by the broken line box 724 and the right-bottom portion of the feature decode matrix is shown diagrammatically by the broken line box 726.

Before discussing the details of the feature decode matrix a discussion of the feature codes is in order. As was noted heretofore each bit of the 8-bit code is assigned descriptive significance with respect to defining the characteristics of the feature defined by such a code. In the preferred embodiment of this invention the presence of a 1 in a particular bit indicates the presence of that characteristic within the feature defined. For example, a 1 in bit 2 indicates the presence of a horizontal component within the feature. A 0 in a bit indicates the absence of the characteristic. For example, a 0 in bit 7 indicates that the feature described by the code does not have a line end. That is, no line ends within the geographic area associated with that code.

In most fonts it has been found that the maximum number of its (whether a 1 or a 0) necessary to decode uniquely is four or five. Bits which are required in order to decode uniquely are hereinafter called unique bits. Accordingly, all that is necessary to decode uniquely is to have the unique bits within the code satisfied and the non-unique bits can be either a 1 or a 0. In the diagrammatic illustration in FIG. 15 all non-unique bits for recognizing the character B are shown by a dot. Accordingly it can be seen that in order to recognize the left-top portion of the upper case B all that is necessary is that a horizontal component and a corner be detected. This is shown by the 1 in bit 2 and the 1 in bit 6. Insofar as the right-bottom feature of the upper case B is concerned the only unique bits are bits 4, 6 and 7, wherein a 1 is present in bit 4 indicating the presence of a diagonal, a 1 is present in bit 6 indicating the presence of a corner and a 0 is present in bit 7 indicating that no portion of a line ends within the right-bottom geographic area.

It should thus be appreciated that by keeping the codes broad, that is keeping the number of unique bits to a minimum, the system is best able to operate reliably, not withstanding the presence of degraded material.

In some applications a more specific code may be required. In such a case additional diodes can be provided within the matrices to effect the generation of a more specific code.

In order to decode the nine, 8-bit binary codes down to single node outputs, one such output for each character the system is to recognize, the feature decode matrix includes means for breaking each bit of the code into two input lines for decoding. One input line is provided for the presence of a 1 in the bit and the second line is provided for the presence of a 0 in that bit. To that end each output line of the code register is provided, via one inverter to an input line of the feature decode matrix and via said one inverter and a second inverter to a second input line of the feature decode matrix. This is shown clearly in FIG. 16A.

As can be seen in FIG. 16A the feature code register ouput lines B1LT, B2LT, B3LT, B4LT B5LT, B6LT, B7LT and B8LT are connected to inputs to inverters 728, 730, 732, 734, 736, 738, 740 and 742, respectively. The outputs of the inverters are connected to respective lines, called inverted input lines. Such lines are denominated by the legend "=0" and also including an indication of the associated bit. Accordingly, the output of inverter 728 is provided on inverted line B1=0, the output of inverter 730 is provided on inverted line B2=0, the output of inverter 732 is provided on inverted line B3=0, the output of inverter 734 is provided on inverted line B4=0, the output of inverter 736 is provided on inverted line B5=0, the output of inverter 738 is provided on inverted line B6=0, the output of inverter 740 is provided on inverted line B7=0 and the output of inverter 742 is provided on inverted line B8=0.

As can be seen additional inverters 744, 746, 748, 750, 752, 754, 756 and 758 are connected to the outputs of inverters 728, 730, 732, 734, 736, 738, 740 and 742, respectively. The output of the inverters 744–750 are connected to respective lines, called true input lines. Such lines are denominated by the legend "=1" and also include an indication of the associated bit. Accordingly, the output of inverter 744 is provided on true line B1=1, the output of inverter 746 is provided on true line B2=1, the output of inverter 748 is provided on true line B3=1, the output of inverter 750 is provided on true line B4=1, the output of inverter 752 is provided on true line B5=1, the output of inverter 754 is provided on true line B6=1, the output of inverter 756 is provided on true line B7=1 and the output of inverter 758 is provided on true line B8=1.

With the circuitry of FIG. 16A arranged as just described it will be appreciated that a 1 or high signal provided on any of its input lines B1LT–B8LT will appear as a 1 on its associated true input line. For example a high signal appearing on line B2LT, thereby indicating the presence of a horizontal line in the upper right-hand corner of the character being scanned, is inverted to a 0 by inverter 730 and provided as a 0 on inverted input line B2=0 while being inverted again by inverter 746 to provided a 1 on true input line B2=1.

It should thus be appreciated that the "true" inputs to the decode matrix, when provided with a 1 thereon, serve to indicate the presence of a 1 in their associated bit of the binary code, while the "inverted" inputs to the decode matrix, when provided with a 1 thereon, serve to indicate the presence of 0 in their associated bit of the code.

As can be seen the matrix shown in FIG. 16A includes a plurality of diodes 760. The diodes are connected to the ture wand inverted inputs to the matrix in a manner to be described hereinafter. The output of the portion of the matrix shown in FIG. 16A includes 26 lines, hereinafter referred to as character lines, with each line representing a different upper case character of the English alphabet. To that end, each line is provided with the legend indicating the character associated therewith. It is to be appreciated that the feature decode matrix may include any number of upper case and lower case characters as well as various other symbols, numbers. etc.

In order to decode the upper case B the cathodes of two diodes 760 are connected to true input lines B2=1 and B6=1, respectively, while the anodes of said diodes are connected to output line B. The upper case C is decoded via four diodes 760 whose cathodes are connected to real input lines B5=1, B6=1, B8=1 and inverted input line B7=0, respectively while their anodes are connected to line C. In order to decode the upper case D the cathodes of three diodes 760 are connected to real unput lines B1=1 B4=1 and B6=1 while their anodes are connected to line D. In order to decode E the cathode of a single diode is connected to real input line B6=1 and the anode thereof is connected to line E. In order to decode the F the cathode of a single diode 760 is connected to real input line B6=1 and the anode thereof is connected to line F. In order to decode G the cathode of four diodes 760 are connected to real input lines B5=1, B6=1, B8=1 and the inverted input line B7=0, respectively, while their anodes are connected to line G. In order to decode upper case H the cathodes of four diodes 760 are connected to real unput lines B3=1, B7=1 and to inverted input lines B5=0 and B6=0, respectively, while their anodes are connected to line H. In order to decode I the cathodes of two diodes 760 are connected to real input lines B2=1, and B7=1, respectively, while their anodes are connected to line I. In order to decode J the cathodes of two diodes 760 are connected to inverted input lines B6=0 and B7=0, respectively, while their anodes are connected to line J. In order to decode K the cathodes of three diodes 760 are connected to real. input lines B3=1, and B7=1 and inverted input line B8=0 respectively, while their anodes are connected to line K. In order to decode L the cathodes of three diodes 760 are connected to inverted input line B2=0 and real input lines B3=1 and B7=1, respectively, while their anodes are connected to line L. In order to decode M the cathodes of three diodes 760 are connected to real input lines B3=1, B5=1 and inverted input line B7=0, respectively, while their anodes are connected to line M. In order to decode N the cathodes of two diodes 760 are connected to real input lines B3=1 and B5=1, respectively, while their anodes are connected to line N. In order to decode O the cathodes of four didodes 760 are connected to real input lines B5=1, and inverted input line B7=0, respectively, while their anodes are connected to line O. In order to decode P the cathode of a single diode 760 is connected to true input line B6=1, while its anode is connected to line P. In order to decode Q the cathodes of four diodes 760 are connected to real input lines B5=1, B6=1, B8=1 and to inverted input line B7-0 while the anodes are connected to line Q. In order to decode R the cathode of a single diode 760 is connected to true input line B6=1 and the anode of such diode is connected to line R. In order to decode S the cathodes of three diodes 760 are connected to real input lines B5=1 and inverted input line B7=0, respectively, while the anodes are connected to line S. In order to decode T the cathodes of two diodes 760 are connected to real input lines B2=1 and B7=1, respectively, while the anodes are connected to line T. In order to decode U the cathodes of two diodes 760 are connected to true input lines B3=1 and B7=1, respectively, while the anodes are connected to line U. In order to decode V the cathodes of two diodes 760 are connected to real input lines B3=1 and B7=1, respectively, while the anodes are connected to line V. In order to decode W the cathodes of two diodes 760 are connected to true input lines B3=1 and B7=1, respectively, while the anodes are connected to line W. In order to decode X the cathodes of two diodes 760 are connected to true input lines B4=1 and B7=1, respectively, while the anodes are connected to line X. In order to decode Y the cathodes of three diodes 760 are connected to true input lines B4=1, B7=1 and the inverted input line B6=0, respectively, while the anodes are connected to line Y. In order to decode Z the cathodes of two diodes 760 are connected to true input lines B2=1 and B7=1, respectively, while the anodes are connected to line Z.

Operation of the feature decode matrix portion shown in FIG. 16A is as follows: Upon the setting of bits 2 and 6 of the portion 720 of the feature register 68, as described heretofore, a 0 is provided on line B1LT, a 1 is provided on line B2LT, a 0 is provided on line B3LT, a 0 is provided on line B4LT, a 0 is provided on line B5LT, a 1 is provided on line B6LT, a 0 is provided on line B7LT and a 0 is provided on line B8LT. The 1 on line B2LT is twice inverted by inverters 730 and 746 to provide a 1 on real input line B2=1. Similarly the 1 on line B6LT is twice inverted by inverters 738 and 754 to provide a 1 on true input line B6=1. The high signals appearing on lines B2=1 and B6=1 thus appear at the cathodes of the diodes 760 connected thereto. This action precludes such diodes from conducting and a high signal or 1 appears at their anodes on line B. At the same time the low or 0 signals appearing on lines B1LT, B3LT, B4LT, B5LT, B7LT and B8LT are coupled through the associated inverters to input lines to the matrix, whereupon at least one diode connected to each of the output or character lines of the matrix are rendered conductive. As will be apprecaited if any diode connected to a character line is rendered conductive such line will be drawn to ground potential. Accordingly when the portion 720 of the feature code register 68 provides the 8-bit binary code as described herein only the diodes whose anodes are connected to character line B are not rendered conductive, whereupon only line B has a high signal thereon.

In a similar manner the diodes of the left-middle portion of the matrix 70 encode the 8-bit binary code of 111XXXXX (the X's representing the non-unique bits shown by the dots in the illustration in FIG. 9) into a high or 1 on the B character line associated with that portion of the matrix, the diodes of the left-bottom portion of the matrix encode the code X1XXX1XX (shown in FIG. 9) into a 1 on the B character line associated with that portion of the matrix, the diodes of the center-top portion of the matrix encode the code of X1XXXXXX (shown in FIG. 9) into a 1 on the B character line associated therewith, the diodes of the center-middle portion of the matrix encode the code of X1XXXXXX (shown in FIG. 9) into a 1 on the B character line associated therewith, the diodes of the center-bottom portion of the matrix encode the code of X1XXXXXX (shown in FIG. 9) into a 1 on the B character line associated therewith, the diodes of the right-top portion of the matrix encode the code of XXX1X1XX (shown in FIG. 9) into a 1 on the B character line associated therewith, the diodes of the right-middle portion of the matrix encode the code of 1XXX1XXX (shown in FIG. 9) into a 1 on the B character line associated therewith and the diodes of the right-bottom portion of the matrix encode the code of XXX1X10X (shown in FIG. 9) into a 1 on the B character line associated therewith.

As can be seen in FIG. 13 each character line from a geographic area portion of the feature decode matrix is connected to a corresponding character line of every other geographic area portion of the feature decode matrix. For example, as can be seen character line A from portion 722 is connected to character line A or portion 724 and character line A of portion 726. Similarly character line B of portions 722, 724 and 726 are connected together as are character lines C and so forth,. By connecting the corresponding character lines to one another and AND function results. It should thus be appreciated that when an upper case B is being scanned by the system a high signal will be provided on character line B from the portion 722, as described immediately above, and similar high signals will appear on the character lines B from the remaining portions of the character decode matrix. When all of the character lines B are provided with high signals thereon a high signal appears at a character recognition line B in the character encode matrix portion of the feature decode/character encode matrix 70.

The details of the character encode matrix portion are shown in FIG. 16B. As can be seen therein the inputs to this portion of the matrix 70 comprises a plurality of character recognition lines, which lines represent the AND outputs of the character lines from the feature decode portion of matrix 70. The lines shown in FIG. 16 are 26 in number and represent the upper case letters of the entire English alphabet. To that end each of the inputs is provided with the legend indicating the upper case character associated therewith.

As noted heretofore the function of the character encode matrix portion of the feature decode/character encode matrix 70 is to encode the single character recognition inputs into a binary code which the central processor 104 can use. To that end, the encode matrix includes plural output lines 762, 764, 766, 768, 770, 772, 774, 776, 778 and 780. Each line is connected, via an associated resistor 781, to a source of positive potential $V_{cc}$. Lines 762, 764, 766, 768, 770, 772, 774, 776, 778 and 780 are also connected, via jumpers 782, to binary output code lines 784, 786, 788, 790, 792, 794, 796, 798, 800 and 802. Output lines 784-802 represent a binary code which the central processor is arranged to recognize.

The central processor is arranged to receive a 12-bit code, indicating the character recognized (e.g., upper case B), with the first six bits describing the character, the next three bits describing the grouping, e.g., whether upper case, lower case, numeric, etc., the eleventh bit indicating simultaneous recognition of two or more characters and the last bit indicating valid recognition of a character. The 12-bit code is provided on lines 784-802, the last two bits being provided by lines (not shown).

As can be seen in FIG. 16B a plurality of diodes 804 are connected, via their anodes, to lines 774, 776, 778 and 800 and via their cathodes to each of the character recognition lines A, B, C, D, E, F, G, H, I, J, K, L, M, N, O, P, Q, R, S, T, U, V, W, X, Y and Z. The diodes 804 are provided to extablish coding information of the last six bits of the 12-bit code for use by the central processor.

For reasons which will be appreciated later an inverter and driver 806 is provided in each of the character recognition lines A through Z.

The matrix shown in FIG. 16B also indicates further diodes, denoted by the reference numeral 808, which effect the encoding of the first six bits of the 12-bit code.

The following description is illustrative of the encoding of the first six bits of the 12-bit code for each upper case character. In this regard the seventh, eighth and ninth bits in the 12-bit code are at the 1 level indicating that the character is an upper case character.

In order to encode the A into the binary code for use by the central processor the cathode of a single diode 808 is connected to the output of the inverter 806 in the A recognition line, with the anode thereof being connected to line 762. In order to encode B into the binary code the cathode of a single diode 808 is connected to the output of the inverter 806 in the B recognition line and the anode thereof is connected to line 764. In order to encode C into the binary code the cathode of a pair of diodes 808 are connected to the output of the inverter 806 in the C recognition line and the anodes thereof are connected to lines 762 and 764, respectively. In order to encode D into the binary code the cathode of a single diode is connected to the output of the inverter 806 in the D recognition line and the anode thereof is connected to line 766. In order to encode E into the binary code the cathode of a pair of diodes 808 are connected to the output of the inverter 806 in the E recognition line and the anodes thereof are connected to lines 762 and 766, respectively. In order to encode F into the binary code the cathodes of two diodes 808 are connected to the output of the inverter 806 in the F recognition line and the anodes thereof are connected to lines 764 and 766, respectively. In order to encode G into the binary code the cathodes of three diodes 808 are connected to the output of the inverter 806 in the G recognition line and the anodes thereof are connected to lines 762, 764, and 766, respectively. In order to encode H into the binary code the cathode of a single diode 808 is connected to the output of the inverter 806 in the H recognition line and the anode thereof is connected to line 768. In order to encode I into the binary code the cathode of two diodes 808 are connected to the output of the inverter 806 in the I recognition line and the anodes thereof are connected to lines 762 and 768, respectively. In order to encode J into the binary code the cathodes of two diodes 808 are connected to the output of the inverter 806 in the J recognition line and the anodes thereof are connected to lines 764 and 768, respectively. In order to encode the K into the binary code the cathodes of three diodes 808 are connected to the output of the inverter 806 in the K recognition line and the anodes thereof are connected to lines 762, 764, and 768, respectively. In order to encode the L into the binary code the cathodes of two diodes 808 are connected to the output of inverter 806 in the L recognition line and the anodes thereof are connected to lines 766 and 768, respectively. In order to encode the M into the binary code the cathode of three diodes 808 are connected to the output of inverter 806 in the M recognition line and the anodes thereof are connected to lines 762, 766 and 768, respectively. In order to encode the N into the binary code the cathodes of three diodes 808 are connected to the output of inverter 806 in the N recognition line and the anodes thereof are connected to lines 764, 766 and 768, respectively. In order to encode the O into the binary code the cathodes of four diodes 808 are connected to the output of inverter 806 in the O recognition line and the anodes thereof are connected to lines 762, 764, 766 and 768, respectively. In order to encode the P into the binary code the cathode of a single diode 808 is connected to the output of inverter 806 in the P recognition line and the anode thereof is connected to line 770. In order to encode the Q into the binary code the cathode of two diodes 808 are connected to the output of inverter 806 in the Q recognition line and the anodes thereof are connected to lines 762 and 770, respectively. In order to encode the R into the binary code the cathodes of two diodes 808 are connected to the output of inverter 806 in the R recognition line and the anodes thereof are connected to lines 764 and 770, respectively. In order to encode the S into the binary code the cathodes of three diodes 808 are connected to the output of inverter 806 in the S recognition line and the anodes thereof are connected to lines 762, 764, and 770, respectively. In order to encode the T into the binary code the cathodes of two diodes 808 are connected to the output of the inverter 806 in the T recognition line and the anodes thereof are connected to lines 766 and 770, respectively. In order to encode the U into the binary code the cathodes of three diodes 808 are connected to the output of inverter 806 in the U recognition line and the anodes thereof are connected to lines 762, 766, and 770, respectively. In order to encode the V into the binary code the cathodes of three diodes 808 are connected to the output of inverter 806 in the V recognition line and the anodes thereof are connected to lines 764, 766 and 770, respectively. In order to encode the W into the binary code the cathodes of four diodes 808 are connected to the output of inverter 806 in the W recognition line and the anodes thereof are connected to lines 762, 764, 766 and 770, respectively. In order to encode the X into the binary code the cathodes of two diodes 808 ae connected to the output of the inverter 806 in the X recognition line and the anodes thereof are connected to lines 768 and 770, respectively. On order to encode the Y into the binary code the cathodes of three diodes 808 are connected to the output of the inverter 806 in the Y recognition line and the anodes thereof are connected to lines 762, 768 and 770, respectively. In order to encode the Z into the binary code the cathodes of thereee diodes 808 are connected to the output of the inverter 806 in the Z recognition line and the anodes thereof are connected to lines 764, 768 and 770, respectively.

Operation of the character encode matrix shown in FIG. 16B is as follows: Assuming that a high or 1 signal is provided on character recognition line B, indicating the recognition, by the circuitry heretofore described, of the upper case B, the high signal appearing on such line is inverted by the inverter 806 therein and provided as a ground active or 0 signal to the cathodes of the diodes connected thereto. This action causes the diodes to conduct, thereby pulling the lines to which their anodes are connected to ground. Accordingly, in the example herein lines 764, 774, 776 and 780 are pulled to ground upon the appearance of a 1 on character recognition line B. The ground signals appearing on lines 764 and 774–780 are coupled, via associated jumpers 782, to output lines 786 and 796–802, respectively. Accordingly, the binary code which is produced by the character encode matrix in response to the provision of a signal on the B recognition line is 010000111. As noted heretofore the last four bits are merely utilized to provide coding information for the central processor. The first six bits carry the information as to the character recognized.

While not shown in the drawings the feature decode/- character encode matrix 70 also includes a portion, composed of diodes in a matrix which are connected as AND gates with the other diodes in matrix 70, to disable or enable certain character recognition lines in response to signals from the data select circuit as provided on lines 124 under the direction of the controller.

It can therefore be seen that a new and improved character recognition has been provided herein. This system, like the system described and claimed in the aforenoted U.S. Pat. No. 3,613,080, utilizes feature extraction for detecting features independently of each other within the character, thereby enabling a more detailed study of the specific shapes of features while in addition being extremely adaptable for addition or substitution of variouse characters in the system without necessitating the use of complicated interconnections and components.

In addition the system of the instant invention enables the generation of sub-feature masks with a minimum number of components. Further still this invention overcomes the problems inherent in scanning degraded type through the use of two video shift registers, one register for positive video and the other for negative video.

Without further elaboration, the foregoing will so fully illustrate my invention that others may, by applying current or future knowledge, readily adapt the same for use under various conditions of service.

What is claimed as the invention is:

1. In a character recognition system comprising means for scanning a character on a document field, said character being composed of plural features, each feature being a two dimensional portion of said character within a respective geographic area defined on said character, a video shift register having a plurality of stages for serially storing and shifting a binary quantization of the character pattern sample within said field, each of said geographic areas being defined by plural rows and plural columns of bits of said binary quantization, improved feature extraction logic comprising a plurality of independent feature detecting means, each formed in a predetermined shape having at least two rows and two columns of bits, each of said feature detecting means being responsive to said binary quantization to provide a respective signal indicative of the recognition by said masking means of the associated predetermined two dimensional feature as the character pattern sample passes through selected stages of said video shift register, said feature detecting means being coupled to said selected stages of the video shift register and to means for enabling said feature detecting means only during the time interval in which the character pattern sample corresponding to the portion of the character within a respective geographic area passes through said selected stages of the video shift register, first encoding means connected to said feature detectors for encoding the signals from said feature detectors into plural, multi-bit binary codes, one such code for each of said geographic areas, each bit of each code defining a shape characteristic of the feature within said area, whereupon the code formed by said bits indicates the two dimensional shape of the feature detected within said geographic area and plural storage means coupled to said first means, each of said storage means serving to store a respective on of said binary codes.

2. The system of claim 1 additionally comprising first decode means coupled to said storage means for decoding the information stored in all of said storage means to provide a signal indicating the recognition of a character having the features detected.

3. The system of claim 2 additionally comprising second encoding means for encoding the signal indicating the recognition of a character into a binary code for use by a central processor.

4. The system of claim 2 wherein said first encoding means comprises a diode matrix.

5. The system of claim 2 wherein the first encoding means comprises a diode matrix and wherein the first decoding means comprises a diode matrix.

6. The system of claim 5 wherein said storage means comprise plural shift registers.

7. The system of claim 1 wherein each of said feature detecting means comprises plural mask matrices, each matrix comprising a plurality of gates coupled to various stages of said video shift register and operative to continuously sense predetermined binary combinations in said video shift register as said binary quantization is shifted through said system.

8. The system of claim 7 wherein each matrix provides an output signal indicative of the detection of a predetermined two dimensional sub-feature of the character pattern sample, the output of at least one of said masks being provided as an input to at least another of said masks and the output of all masks not serving as inputs to other masks serving as inputs to said feature detecting means.

9. The system of claim 1 wherein said binary code comprises eight bits.

10. The system of claim 9 wherein the first bit is used to describe an intersection or a serif, the second bit is used to describe a horizontal component, the third bit is used to describe a vertical component, the fourth bit is used to describe a diagonal component, the fifth bit is used to describe an angle, the sixth bit is used to describe a corner, the seventh bit is used to describe a line end and the eighth bit is used to separate shapes of a type within said geographic area.

11. In a character recognition system comprising means for scanning a character on a document field, said character being composed of plural features, each feature being a two dimensional portion of said character within a respective geographic area defined on said character, a video shift register having a plurality of stages for serially storing and shifting a binary quantization of the character pattern sample within said field, each of said geographic areas being defined by plural rows and plural columns of bits of said binary quantization, plural mask matrices, each matrix forming at least two rows and two columns of bits and comprising a plurality of gates coupled to various stages of said video shift register, said gates being enabled continuously to sense predetermined binary combinations in said video shift register as said binary qusantization is shifted through said system, improved feature extraction logic comprising plural feature detecting means, each of which being connected to different combinations of said mask matrix gates and operative, when enabled, to provide a respective signal indicative of the recognition by said mask matrices of the associated predetermined two dimensional feature and timing means for enabling each of said feature detectors only during the time interval in which a portion of the character pattern sample, corresponding to the portion of the character within its associated geographic area, passes through said selected stages of said video shift register, first encoding means connected to said feature detecting means for encoding the signals from said feature detecting means into plural, multi-bit binary codes, one such code for each of said geographic areas, each bit of each code defining a shape characteristic of the feature within said area, whereupon the code formed by said bits indicates the two dimensional shape of the feature detected within said geographic area and plural storage means serving to store a respective one of said binary codes.

12. The system of calam 11 additionally comprising first decode means coupled to said storage means for decoding the information stored in all of said storage means to provide a separate signal indicating the recognition of a character having the features detected.

13. The system of claim 12 additionally comprising second encoding means for encoding the signal indicating the recognition of a character into a binary code for use by a central processor.

14. The system of claim 13 wherein said first and second encoding means each comprise a diode matrix and wherein said decode means comprises a diode matrix.

15. The system of claim 14 wherein said storage means comprises plural registers.

16. The system of claim 15 wherein said geographic areas are nine in number.

17. The system of claim 16 wherein said binary code comprises eight bits.

18. The system of claim 17 wherein the first bit is used to describe an intersection or a serif, the second bit is used to describe a horizontal component, the third bit is used to describe a vertical component, the fourth bit is used to describe a diagonal component, the fifth bit is used to describe an angle, the sixth bit is used to describe a corner, the seventh bit is used to describe a line end and the eighth bit is used to separate shapes of a type within said geographic area.

* * * * *